US012703009B2

(12) United States Patent
Wang et al.

(10) Patent No.: US 12,703,009 B2
(45) Date of Patent: Aug. 11, 2026

(54) MELEE GEMSTONE SORTING MACHINE AND METHODS FOR ANALYSIS

(71) Applicant: Gemological Institute of America, Inc. (GIA), Carlsbad, CA (US)

(72) Inventors: Zhen Wang, Secaucus, NJ (US); RJ Pisani, Brooklyn, NY (US); Joseph Mcenery, New York, NY (US); Barak Ergi, Fairlawn, NJ (US); Yong Liu, Edison, NJ (US); Hiroshi Takahashi, Morristown, NJ (US); Sudhin Mandal, Greenville, DE (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 50 days.

(21) Appl. No.: 18/818,570

(22) Filed: Aug. 28, 2024

(65) Prior Publication Data

US 2025/0073756 A1 Mar. 6, 2025

Related U.S. Application Data

(60) Provisional application No. 63/535,059, filed on Aug. 28, 2023.

(51) Int. Cl.
*B07C 5/342* (2006.01)
*G01N 21/87* (2006.01)

(52) U.S. Cl.
CPC ............ *B07C 5/342* (2013.01); *G01N 21/87* (2013.01)

(58) Field of Classification Search
CPC ............ B07C 5/342; B07C 5/36; G01N 21/87
See application file for complete search history.

(56) References Cited

U.S. PATENT DOCUMENTS

| | | | |
|---|---|---|---|
| 5,503,592 A | 4/1996 | Neumann | |
| 2015/0219567 A1 | 8/2015 | Sim et al. | |
| 2024/0326097 A1* | 10/2024 | Harris | B07C 5/342 |

FOREIGN PATENT DOCUMENTS

| | | |
|---|---|---|
| EP | 2914387 B1 | 3/2018 |
| WO | 2023084210 A1 | 5/2023 |

OTHER PUBLICATIONS

International Search Report and Written Opinion of the International Searching Authority (U.S. Patent and Trademark Office) for PCT/US24/44301 dated Nov. 4, 2024 (12 pages).

* cited by examiner

*Primary Examiner* — Jacob S. Scott
*Assistant Examiner* — Miraj T. Patel
(74) *Attorney, Agent, or Firm* — DLA PIPER LLP (US); Blake W. Jackson; Thomas J. Fuller

(57) ABSTRACT

The present embodiments relate to a modular system to sort and analyze melee sized gemstones in an automated manner. The system can use a rotating tabletop design to separate gemstones for individual analysis and sorting. For instance, a feeder subsystem can obtain gemstones, and a singulation subsystem can orient the gemstones for further processing. The gemstone can move between subsystems due to the rotation of the table. A set of metric subsystems disposed about the table can process aspects of the gemstone to derive metrics for the gemstone. Further, a sorting subsystem can sort the gemstone into a corresponding bin based on the derived metrics for the gemstone.

18 Claims, 24 Drawing Sheets

MELEE GEMSTONE SORTING MACHINE AND METHODS FOR ANALYSIS

CROSS REFERENCE TO RELATED APPLICATION

This application claims priority to U.S. Provisional Application No. 63/535,059 filed on Aug. 28, 2023, the entirety of which is hereby incorporated by reference.

TECHNICAL FIELD

The present embodiments relate to systems for analyzing gemstones. Particularly, the present embodiments relate to modular testing systems for bulk melee gemstones.

BACKGROUND

Gemstones are inspected using various analysis tools and methods in order to determine attributes about them such as color, cut, clarity, carat weight, as well as determine if they are natural or lab grown, treated, etc. But these tests often require multiple hardware setups and movement between and among them in order to achieve all of the testing goals. Various techniques providing computer-implemented gemstone analyzing systems have relied on manual movement of the gemstones between these multiple testing setups. While it may make sense to use such techniques for larger stones, such techniques may not be desirable for smaller gemstones, such as melee gemstones, for example where efficiency may be more important.

In some previously designed automated methods, systems have used straight line conveyor belts and pick-and-place robotic systems. But these can be very resource-intensive, big and bulky, and hard to implement. Further, various analytical instruments may not be quick-swappable or modular in such systems and may require extensive resources to implement and maintain. Systems and methods are needed therefore to efficiently and accurately analyze smaller, melee sized gemstones, using multiple testing arrangements.

SUMMARY

Embodiments of the present disclosure may include systems and methods for sorting and analyzing gemstones.

In a first example embodiment, a gemstone analysis system is provided. The gemstone analysis system can include a circular table configured to rotate about a central point. The gemstone analysis system can also include a set of subsystem testing stations disposed about the circular table. For instance, at least a first gemstone in a bulk group can be fed into the system and be singulated in order to visit each of the set of subsystems by rotation of the circular table.

The set of subsystems can include a feeder subsystem configured to receive the first gemstone along with a bulk group of gemstones. The set of subsystems can also include a singulation subsystem configured to orient the first gemstone into a first orientation and one or more metric subsystems. In some instances, the singulation subsystem includes one or more singulation arms disposed at the circular table. The one or more singulation arms can be configured to, as the circular table rotates, orient the first gemstone to the first orientation comprising a top-down orientation, and/or separate the first gemstone to at least a threshold separation from another gemstone.

In some instances, the set of subsystems further include a photo position detection subsystem comprising one or more cameras configured to capture images of the first gemstone and a computer vision model configured to process the captured images of the first gemstone and determine an actual orientation of the first gemstone. Further, the set of systems can include a re-feed subsystem including a first air burst element. The re-feed subsystem can be configured to, responsive to a determination by the computer vision model that the orientation of the first gemstone is outside a threshold orientation range, receive an instruction to eject the first gemstone. The re-feed subsystem can also provide a burst of air by the air burst element to the first gemstone, thereby directing the first gemstone to a bin disposed outside of the circular table.

The metric subsystems can be configured to generate, by each of the one or more metric subsystems, data relating to the first gemstone. The metric subsystems can be further configured to derive, for each of the one or more metric subsystems, one or more metrics using the data generated by each of the one or more metric subsystems. The metric subsystems can be further configured to derive an evaluation metric for the first gemstone based the derived metrics for the first gemstone.

The set of subsystems can also include a sorting subsystem configured to direct each of the first gemstone to a first sorting bin based on the derived evaluation metric for the first gemstone.

In another example embodiment, a system is provided. The system can include a table configured to rotate about a central point (e.g., via a motor). The system can also include a set of subsystems disposed about the table. The set of subsystems can include a feeder subsystem configured to receive at least one gemstone.

The set of subsystems can also include one or more metric subsystems that include one or more sensors configured to capture data relating to the gemstone and at least one computing node. The number of subsystems in the metric subsystems can be variable, providing a modular gemstone analysis system. The computing node can be configured to obtain the data relating to the gemstone, derive, using the obtained data, one or more metrics relating to the gemstone, and generate an evaluation metric for each gemstone based on the one or more metrics for the gemstone. The set of subsystems can also include a sorting subsystem configured to direct each of the one or more gemstones to a first sorting bin according to the derived evaluation metric for each gemstone.

In another example embodiment, a method for analyzing and sorting a gemstone is provided. The method can include receiving at least one gemstone (e.g., a melee gemstone) at a feeder subsystem.

The method can also include orienting, by a singulation subsystem, the gemstone into a first orientation. The singulation subsystem can include one or more arms that can separate the gemstones to at least a threshold distance from one another and orient the gemstones in a top-down orientation.

The method can also include processing the gemstone by a set of metric subsystems. The feeder subsystem, the singulation subsystem, and the set of metric subsystems can be disposed about a singular table. Further, each gemstone can be fed between subsystems via rotation of a table.

Processing the gemstone by the set of metric subsystems can include generating, by each of set of metric subsystems, data relating to the gemstone. The data relating to the gemstone can include images, absorption spectrums (e.g., captured by a UV-VIS spectrophotometer), etc. The data relating to the gemstone can be processed to derive metrics relating to the gemstone.

The derived metrics can be used to derive an evaluation metric for the gemstone. The evaluation metric can include a value combining the metrics for the gemstone representing an overall quality of the gemstone. For example, the evaluation metric can be derived based on a combination of metrics relating to a size, cut, color, clarity, etc., of the gemstone.

The method can also include directing the gemstone to a first sorting bin based on the derived evaluation metric for the gemstone. For example, a sorting subsystem can direct the gemstone using a burst of air into a bin that corresponds with the evaluation metric for the gemstone.

BRIEF DESCRIPTION OF THE FIGURES

For a better understanding of the embodiments described in this application, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

A melee gemstone can include gemstones, either single cut or full cut, weighing less than a specific carat weight, for example, but not limited to ⅕ carat (ct). Often, such sized gemstones need only be analyzed and grouped and may not require individual tracking of each stone. In many instances, it is desirable to analyze melee gemstones, such as to identify a weight or a clarity of each melee gemstone, determine if they are lab grown or natural, if they have been treated, for example. But analyzing such gemstones can be time consuming and onerous due to their size. Bulk analysis may be made more efficient but should not come at the cost of quality of the testing. Therefore, a system is needed to efficiently analyze smaller gemstones such as melee sized but do so with highest quality of analysis systems and methods available.

The present embodiments relate to a modular system to sort and analyze melee sized gemstones in an automated manner. The system can use a rotating tabletop design to intake bulk amounts of melee gemstones and then separate and orient them for individual analysis and sorting at speed.

Further, the system as described herein may use modular design to allow for customized arrangements of test equipment and quick instrument changes, if desired. This can further allow for rapid gemstone processing using highly accurate systems.

Rotating Table Examples

As analysis of gemstones requires multiple testing apparatus. Systems and methods here may be used to take a bulk load of melee sized gemstones, lay them out one at a time and pass each of them under a number of testing stations in order to analyze each of them and then sort them based on the analysis. The systems and methods here do so using a rotating table instead of a straight line conveyor belt or pick and place robot. By using such a rotating table, radial movement may be used to singulate gemstones as described and efficiently move gemstones around a relatively small footprint space to achieve all of the desired analysis.

Figure 1:
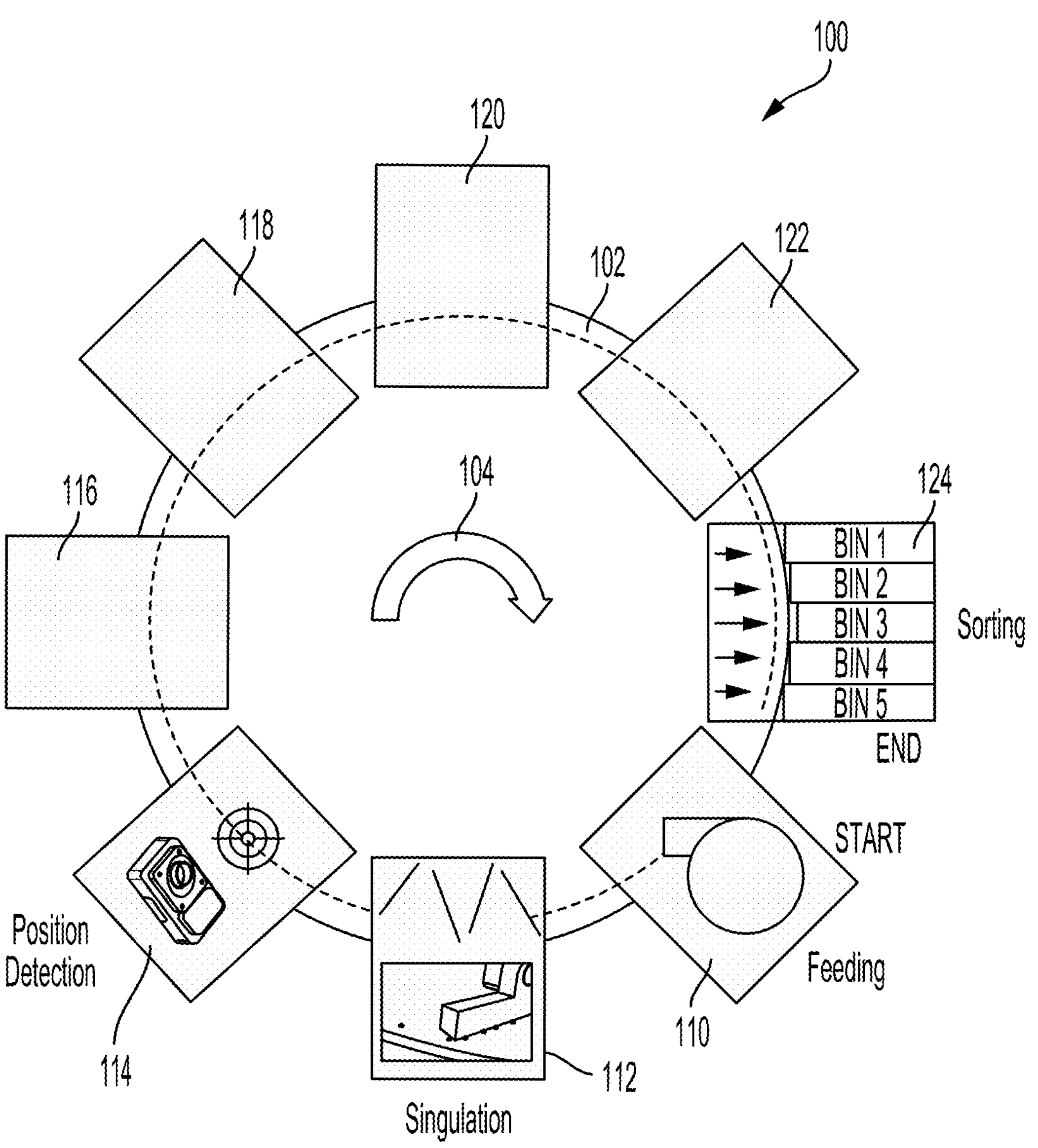
FIG. 1 is an illustration of an example overall system layout in accordance with certain aspects described herein.

FIG. 1 shows an example of the overall system schematic as described from a top down view of a table 102 configured to rotate 104 using a motor or other consistent rotating device (not shown). In some examples, an absolute encoder, servo motor may be used to control both the rotation of the table and the position of the sensor probes. In such examples, a positional accuracy of 0.01 degrees for the table and +/−3 Microns for the probe position may be achieved. All of these motors would be in communication with a computer system as described herein to send and receive commands and data such as testing data.

In some instances, the table can have a rotation speed that is controlled by computers in communication with the table motors as described herein. Further, gemstones can be placed on the table based on the rotation of the table, such as feeding 15 gemstones per 100 degrees of rotation, or one gemstone for each 15 degrees of rotation, of the table. The table speed can be set at any of 2, 5, 10, or 15 degrees per second, for example.

The direction of the table is shown as clockwise but could be arranged in counter-clockwise, depending on the arrangement of the testing stations. In some examples, the table may be able to reverse and back up as commanded by the computer system or for safety reasons such as in response to a sensed clog, snag, or other quick slowdown sensed by the table rotational motor.

Positioned around the table 102 are the various testing stations 116, 118, 120, 122 for the gemstones to interact with along with the sorting arms 112, position detection 114 and buckets for post-analysis storage 124. In many examples, the testing stations may include analysis hardware that may be modular, allowing for a variable number of subsystems to be disposed near the table 202, swapped out, removed for maintenance or upgrade. Examples of testing stations may be UV Vis analysis, camera imaging of gemstones, Raman Probe analysis, or other analysis using lasers, digital cameras or other devices. Further discussion of modular testing stations is had below and for FIG. 9, 10 etc.

Figure 2:
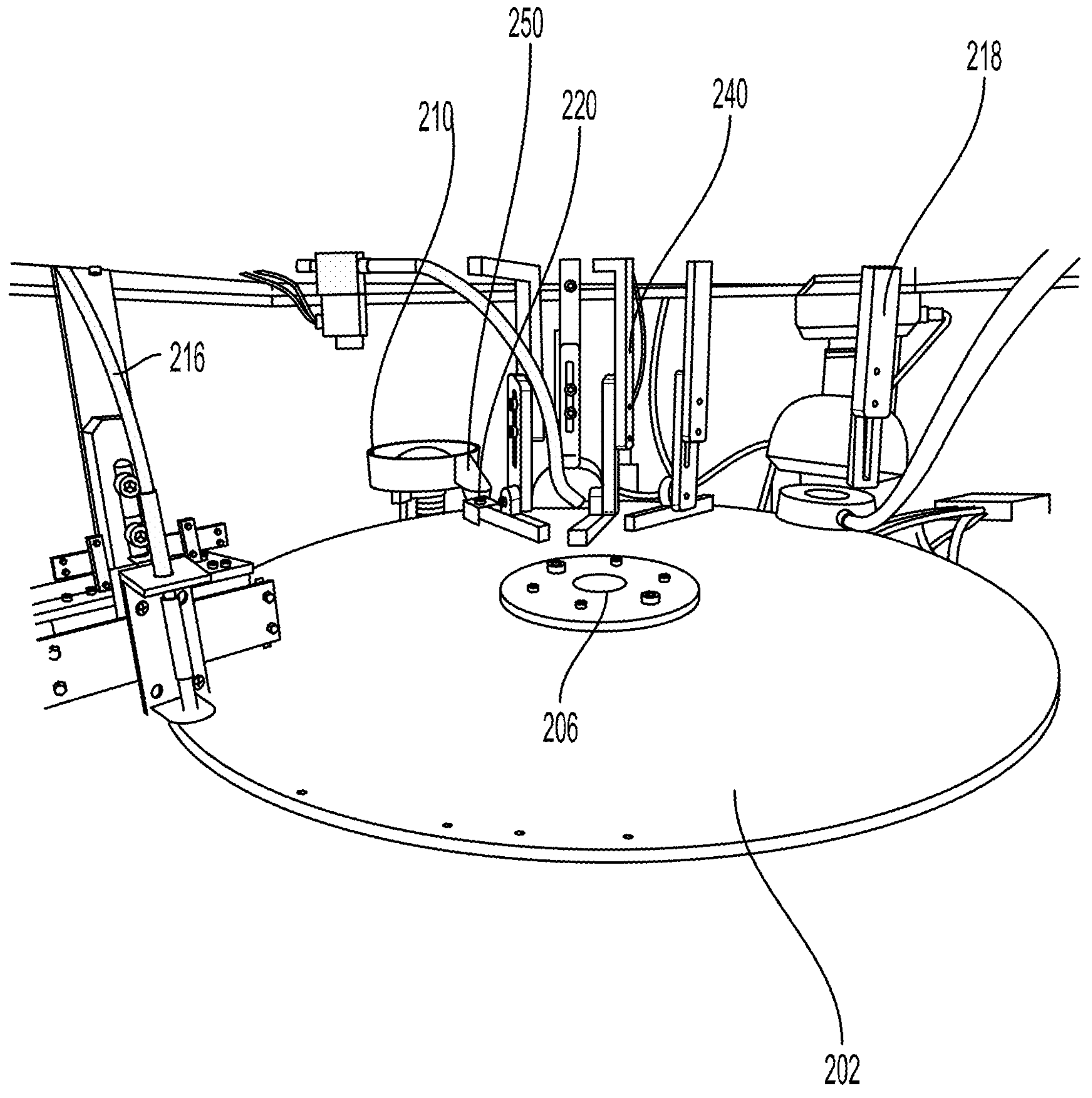
FIG. 2 is an illustration of an example rotating table in accordance with certain aspects described herein.

FIG. 2 shows another angle of the rotatable table 202 along with a central rotating hub 206 and a few example test stations 216, 218 located around the table 202. For example, table 102 can rotate clockwise 104 to expose the gemstones to the various measuring stations as described herein but can also rotate counter-clockwise. Also shown is a bowl feeder 210 where the gemstones may be loaded in bulk to start the process as described herein. Also shown is a guide arm 220 from the bowl feeder and additional guide arms 240 to position gemstones on the table for analysis.

Thus, systems and methods here include utilization of a circular rotating table system to examine multiple melee gemstones (e.g., diamond, ruby, and blue sapphire stones, or any other gemstone) via a number of modularly placed analysis subsystems (e.g., Ultraviolet-visible Spectroscopy (UV-VIS)) and sort the analyzed gemstones based on the recorded measurement results.

Bowl Feeder Examples

Figure 3A:
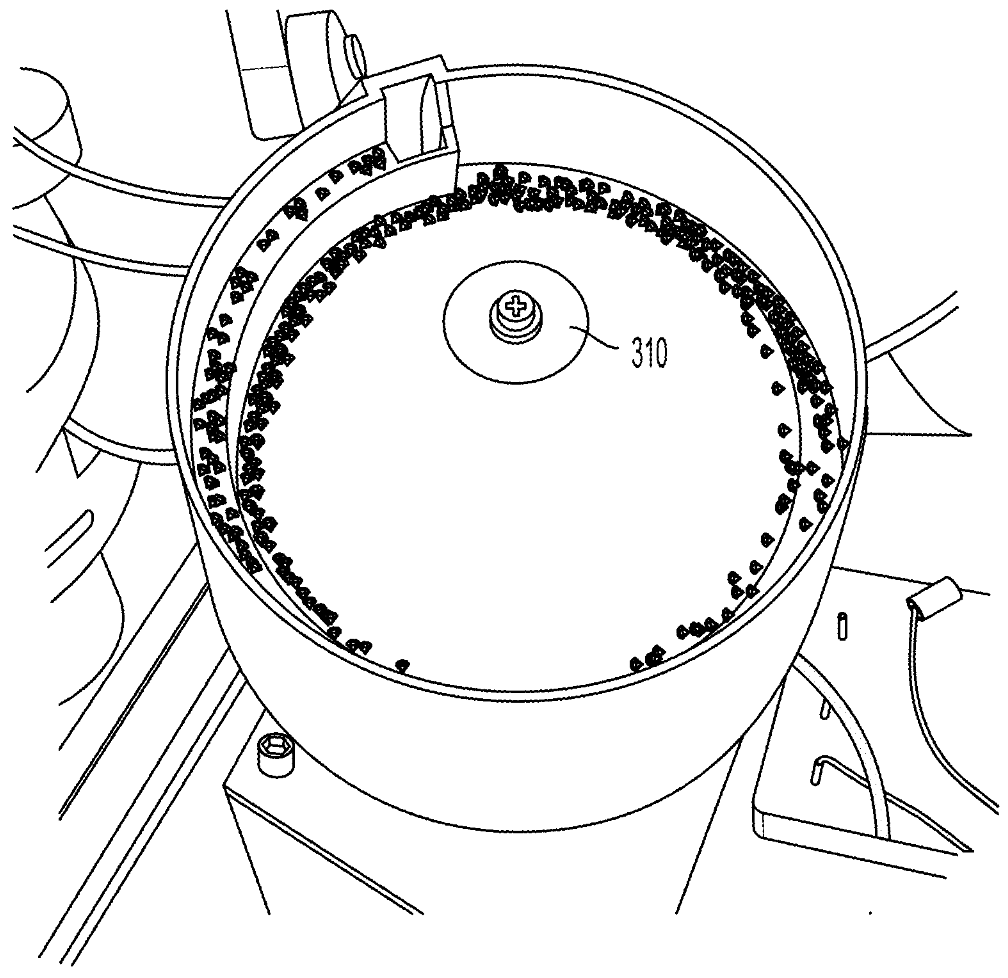
FIG. 3A is an illustration of an example vibration bowl pre-feeder in accordance with certain aspects described herein.

To start the process, the system may include a bulk loading and feeding element. FIG. 2 shows a bowl feeder 210 arranged in proximity to the circular rotating table 202. In such a way, a large number of gemstones may be loaded at the same time but then individually placed on the table 202 for analysis as described herein. FIG. 3A shows a close-up detail of such a bowl feeder 310 into which many multiple melee gemstones may be loaded for analysis.

Figure 3B:
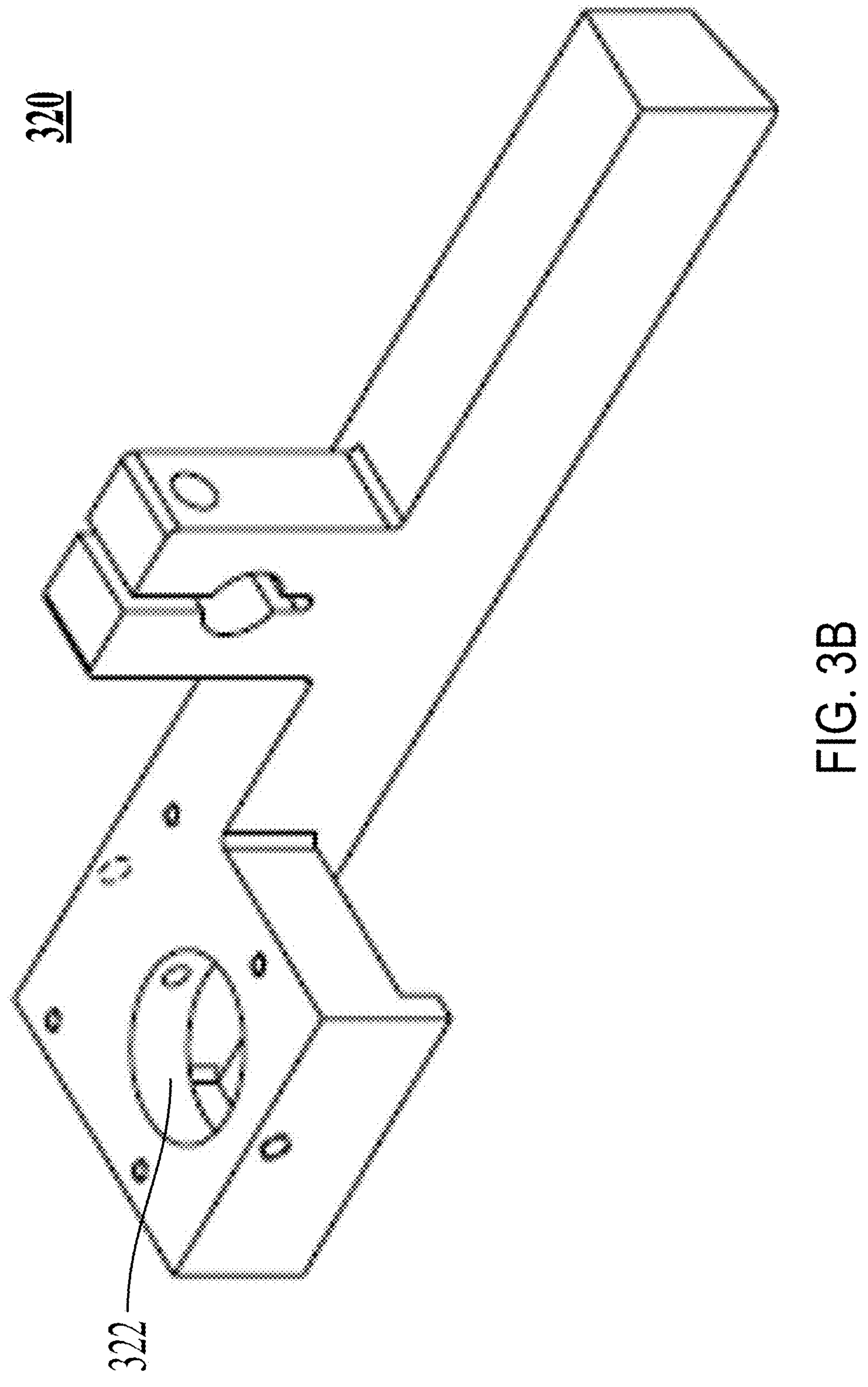
FIG. 3B is an illustration of an example guide arm for the feeder in accordance with certain aspects described herein.
Figure 3C:
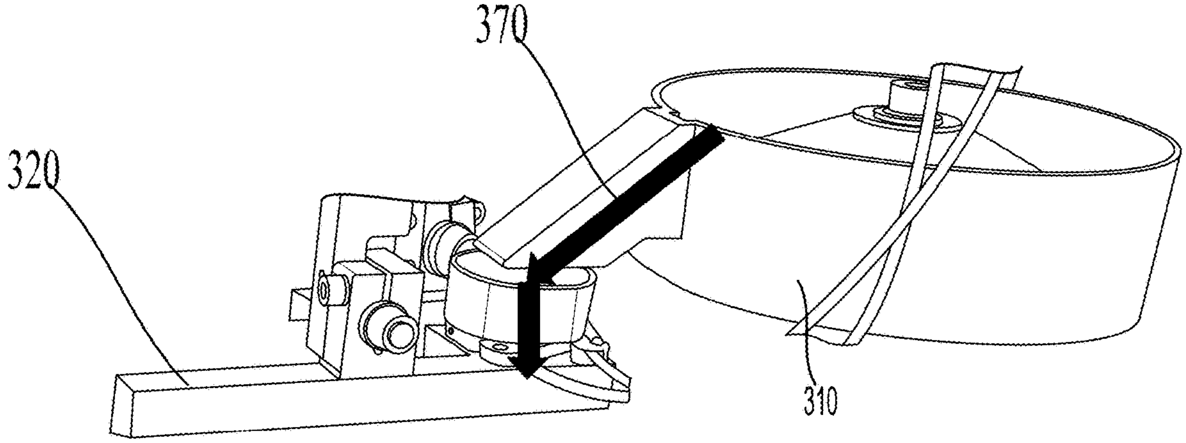
FIG. 3C is an illustration of an example pre feeder and feeder in accordance with certain aspects described herein.

The feeder 210 in FIGS. 2 and 310 in FIG. 3A-C may allow an entire batch of gemstones to be evaluated with only one interaction by the operator or automated system to load. In some examples, over one hundred melee sized gemstones may be loaded in the feeder, but that example is not limiting. The feeder 110 in FIG. 1, 210 in FIG. 2, 310 in FIG. 3B-C may be arranged to cycle on and off to prevent overfeeding the sorting subsystem, and by vibration as described, to move the gemstones onto the rotating circular conveyor table for analysis as described herein.

The bowl feeder 210 in FIGS. 2 and 310 in FIG. 3A may be arranged with a feeder chute 250 in FIG. 2 attached to a guide arm 220 with a hole guidance system built into it. FIG. 3B shows a detail of such a guide arm 320 with a hole 322 arranged in one end. FIG. 3C also shows the feeder chute.

Such a guide arm as shown as 220 in FIGS. 2 and 320 in FIG. 3B would sit above the table 202 as shown in FIG. 2 and the hole 322 in the guide arm 220, 320 would be arranged below the bowl feeder 210 chute 250 to guide any loose melee gemstones as they fall out of the vibrating bowl feeder 210 onto the table 202. In some examples, the guide 320 may include a funnel shape part attached to it, (not shown) where on top of the funnel is the exit of bowl feeder as shown as 250 in FIG. 2.

In some examples, the hole in the dispensing guide bar 322 may be 0.7 inches in diameter. In some examples, the hole 322 may be between 0.5 in and 1 inch in diameter. In some examples, the width of the portion that extends beyond the flat portion of the guide bar may be 1.1 inches wide. In some examples, the portion that extends beyond the flat portion of the guide bar may be 0.9 inches deep. In some examples, the chamfer on the underside of the guide bar may be angled at 15 degrees from horizontal. In some examples, the guide bar may be 5 inches long. In some examples, the guide bar may be 0.5 inches deep. In some examples, the guide bar may be 0.6 inches tall. These dimensions are mere example dimensions and could be 10%-20% larger or smaller depending on the implementation.

FIG. 3C shows another detail of the bowl feeder 310 and the guide arm 320 with the hole in it (not pictured). The arrows 370 show the direction the gemstones fall when they are dispensed from the bowl feeder 310 through the hole in the guide 320 and onto the table.

In some examples, the bowl feeder may include a vibration feature. This vibration or jostling of the bowl feeder may be useful to coax the gemstones down the feeder chute as described. Such vibration may be turned on or off depending on the flow of gemstones and the frequency of the vibration may be increased or decreased based on a motor spinning a weight system to vibrate the bowl 210. Other examples could be a Batch pre-sorter, Pre-Singulation, Pre vibrational singulation.

In some examples, the bowl feeder 210, 310 may implement a half bridge wave rectifier circuit on a potentiometer to control the intensity of vibration. In such examples, this may provide finer control on the speed that stones feed from the bowl feeder onto the table. In addition, it enables the use of one mechanical set up to move stones of various sizes. For example, such an arrangement may be used to move stones sized from 1 mm-4 mm diameter. Other arrangement may be used for different ranges of sizes. In some instances, the bowl feeder, along with other components as described herein, can be turned on and off in order to perform the steps as described herein. Further, a spacing of gemstones from the bowl feeder can be, for example, a minimum of 5 mm between one another or between 5-7 mm.

Guide Arm Examples

As described, when the gemstones land on the table from the feeder bowl, a number of guide arms may be positioned in order to move or manipulate the gemstones on the turning or spinning tabletop. Due to the radial motion of the table and gemstones that fall onto it, these guide arms may be angled such that when the gemstones interact with the guide arms as they rotate, they gently move, orient, or otherwise slide into a desired position as described herein. The ultimate goal of the guide arms is to orient each gemstone in a table down position and separate each from one another in a line to pass under or near each individual testing hardware station and then remove from the table into a coordinated bin according to the results of any testing analysis performed.

As shown in FIG. 1 after the bowl feeder 110, the guide arms 112 are first encountered to guide the gemstones as they land and then begin rotating. Such guide arms are shown in FIG. 2 as 240 and are arranged after the first guide bar 220 guides the gemstones from the bowl feeder 210 onto the table 202. As shown in FIGS. 2, 3B and 3C, the first guide bar may be arranged attached to a funnel section which receives the gemstones from the feeder bowl. These gemstones then fall through the hole in the first guide bar 322 in FIG. 3B and onto the table 202 in FIG. 2. More description of such guide arms are found in FIG. 5C.

After the gemstones fall onto the table 202 they are then oriented and singulated for analysis as described by interacting with various guide bars and the rotating table. For example, once the gemstones land on the table 202, as the table rotates or spins, the gemstones interact with and bump against the various guide arms as discussed herein with the ultimate goal of separating them and singulating them as they rest on the rotating table such that they pass one by one under each substation of testing apparatus described herein.

The sorting guide arm(s) may be made of a plastic such as a Delrin acetal homopolymer (Polyoxymethylene POM) material. Other possibilities include, but are not limited to Aluminum, Stainless, Plastics (such as but not limited to, ABS, TPU, PET-G, PA, PAHT CF15, PP, PP GF30, Teflon, etc.)

Figure 4A:
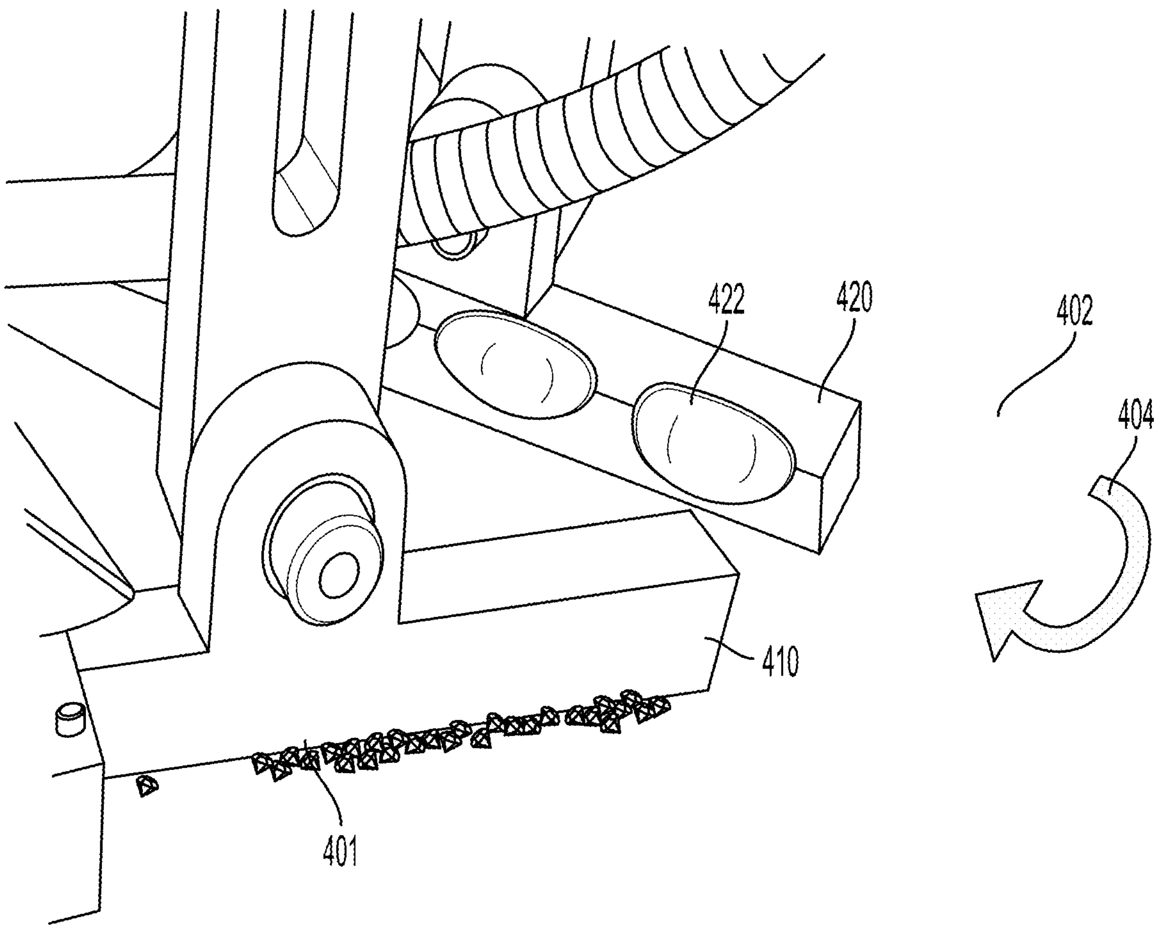
FIGS. 4A-F are illustrations of example sorting guides or arms in accordance with certain aspects described herein.

One example of such a guide arm is shown in FIG. 4A. FIG. 4A is an illustration of an example sorting guide arms 410, 420 after the feeder has dropped the gemstones 401 onto the table 402. The sorting arms 410, 420 can be positioned close to and just above the rotating table 402 and in the example shown, are angled away from a table radial line, such that when the table rotates 404, the gemstones 401 on the rotating table 402 first encounter and interact with the first sorting arm 410. As the table 402 rotates 404 and because the arm 410 is angled with respect to a centerline of the table, the gemstones can interact with the arm 410 and a resultant force can act on the gemstones 401 to push the stones along the first guide arm 410 and begin to line up into a line of individual stones instead of a lump mass of many together. In some examples, a friction grip may be included that is made of or includes Aluminum, Stainless, Plastics (ABS, TPU, PET-G, PA, PAHT CF15, PP, PP GF30, Teflon), in some examples the roughness average may be Ra>1 μm. In some examples, the Ra may be at or near 1 μm.

In some examples, the table surface 402 may be textured to help move the gemstones with a friction grip. In some examples, the table may be is composed of Aluminum, AL6061-T6F, and an outer edge with MJF Nylon 12. A Chemical milling processed may be used to impart a surface roughness of 1.6 TO 6.3 μm. The lay may be particulate, non-directional, or protuberant. Once the gemstones 401 have encountered the first guide arm 410 and the rotating table 404 moves the stones along the arm, the gemstones can lose contact with the first arm and encounter the second arm 420 for proper positioning on the table.

Figure 8:
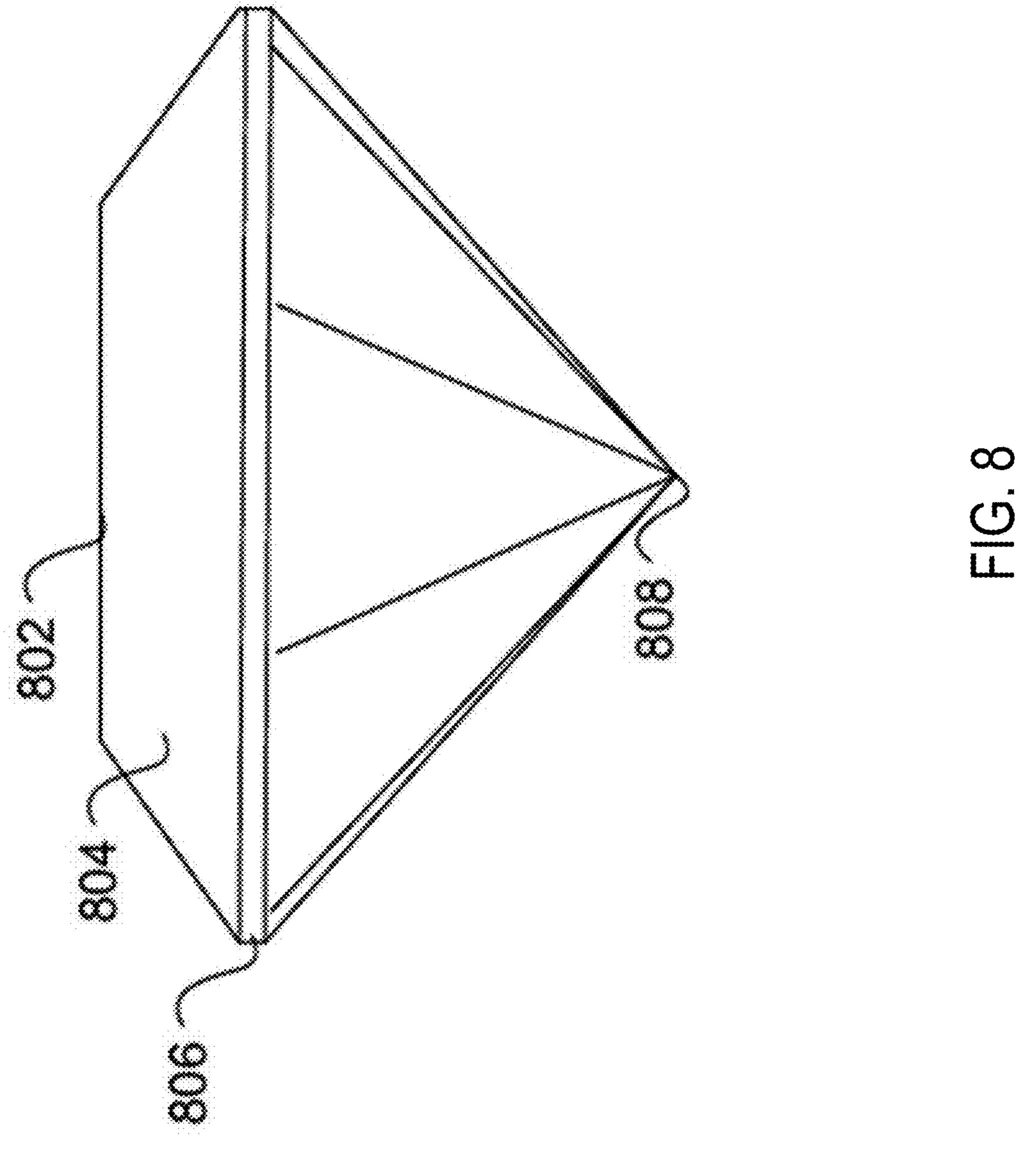
FIG. 8 illustrates an example shape of a melee gemstone used in the systems and methods described herein.

As an illustrative example, melee gemstones can be cut into a shape, such as a shape in FIG. 8. This example shape can be referred to as a round brilliant cut and can include a table 802 a crown 804, girdle 806 and culet 808. Many measurements may be taken with a top view or table-down orientation of a round brilliant cut gemstone. Therefore, it may be desirable to flip or orient all of the melee gemstones on the table into a table-down orientation on their table side as they move around the circulating surface for analysis and sorting.

In the example as shown in FIG. 4A, the second arm 420 can be angled in an opposing direction from the first arm 410, thereby moving the gemstones 401 along the second arm 420 with the rotation of the table 402. In the example of FIG. 4A, the second arm 420 can include an embodiment with scalloped shaped surface with cutouts 422 to assist in flipping the stones 401 and to help orient the gemstones 401 in a table-down orientation. The scallop guide may vary by three to ten scallops per guide. The distance from the bottom of the arm and circulating table can vary from 0.2-4.0 mm.

Figure 4B:
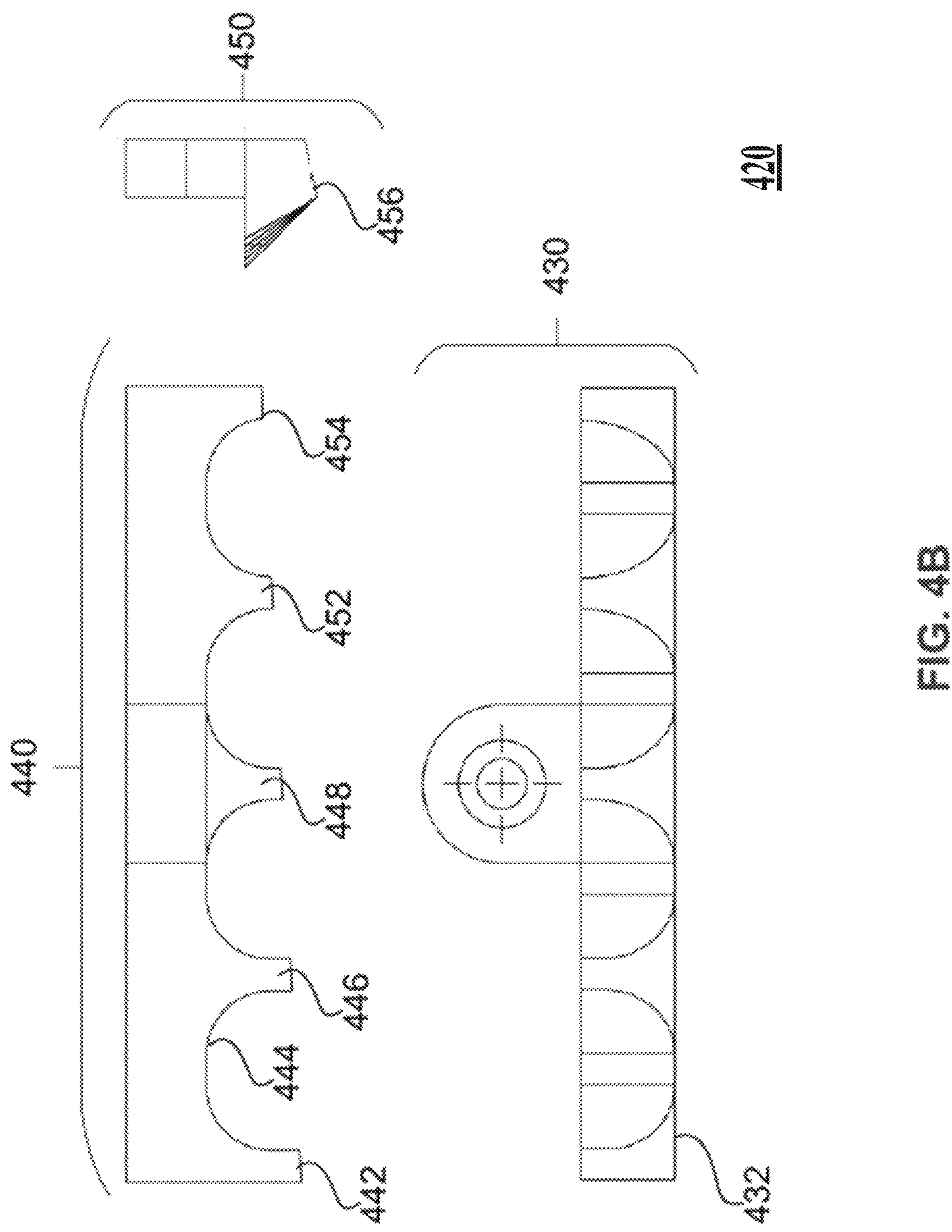
Figure 4C:
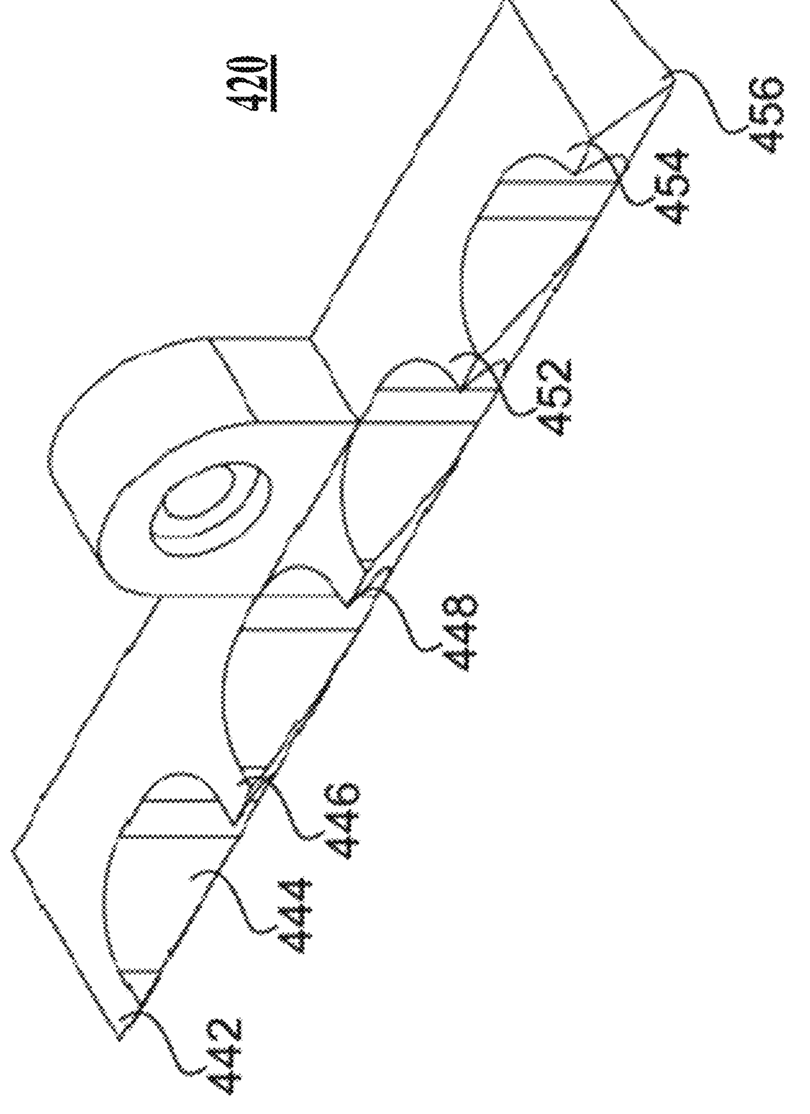

FIGS. 4B and 4C show an example sorting guide arm with curved scallops in accordance with certain aspects described herein to help align the gemstones as they move around on the table.

In FIG. 4B, a top down view 440 and a front view 430 are shown with a side view 450. As shown on the top down view 440, the scalloped side includes alternating portions that extend out 442 and wells or recesses 444 between the next extending portion 446, 448, 452, 454. As can be seen from the top down view, in the example of FIG. 4B, the extended portions become shorter and shorter progressively along the edge. As shown the first extended portion 442 and last extended portion 454 are different lengths. This example of an angled arm, from the top down view 440 may be used to help move the stones as described. In the example, the scalloped shapes can be seen from the front view 430 where the bottom edge 432 moves along the rotating and in some examples, vibrating table, 402 in FIG. 4A to align gemstones as described. The side view 450 shows how the various extended portions between scalloped edges become shorter and shorter and also how in this example, the bottom edge 456 is angled as well, forming an edge that touches the table in use.

FIG. 4C shows how in this example, the scalloped version of the sorting guide arm 420 scalloped edges are arranged from longer 442 to progressively shorter 446, 448, 452 and shortest 454. In some examples a gap or space can be made between a guide and the rotary table to avoid scratching. The recesses 444 are cut into this angled arm and the bottom 456 is also angled as shown. In use, this arm 420 may be configured to vibrate or remain still. In either case, the arm 420 may remain station in relation to the rotating table as described to singulate the gemstones as the table moves. In some example embodiments, the arm 420 would not vibrate as the table rotates.

The dimensions of the scalloped edges may differ, but in some examples, the scallop guide may vary by three to ten scallops per guide. In some examples, the distance from the bottom of the arm 460 and circulating table can vary from 0.1-4.0 mm. In some examples, the sorting arm may be 5 inches long. In some examples, the sorting arm may be between 3 and 6 inches long. In some examples, the depth of the sorting arm may be 1.1 inches deep. In some examples, the sorting arm may be between 0.9 and 1.3 inches deep. In some examples, the sorting arm front angles may be between 45 and 60 degrees from horizontal. In some examples, the height of the sorting arm may be 1.6 inches. In some examples, the height of the sorting arm may be between 1.3 and 2.1 inches. These dimensions are mere example dimensions and could be 10%-20% larger or smaller depending on the implementation.

Figure 4D:
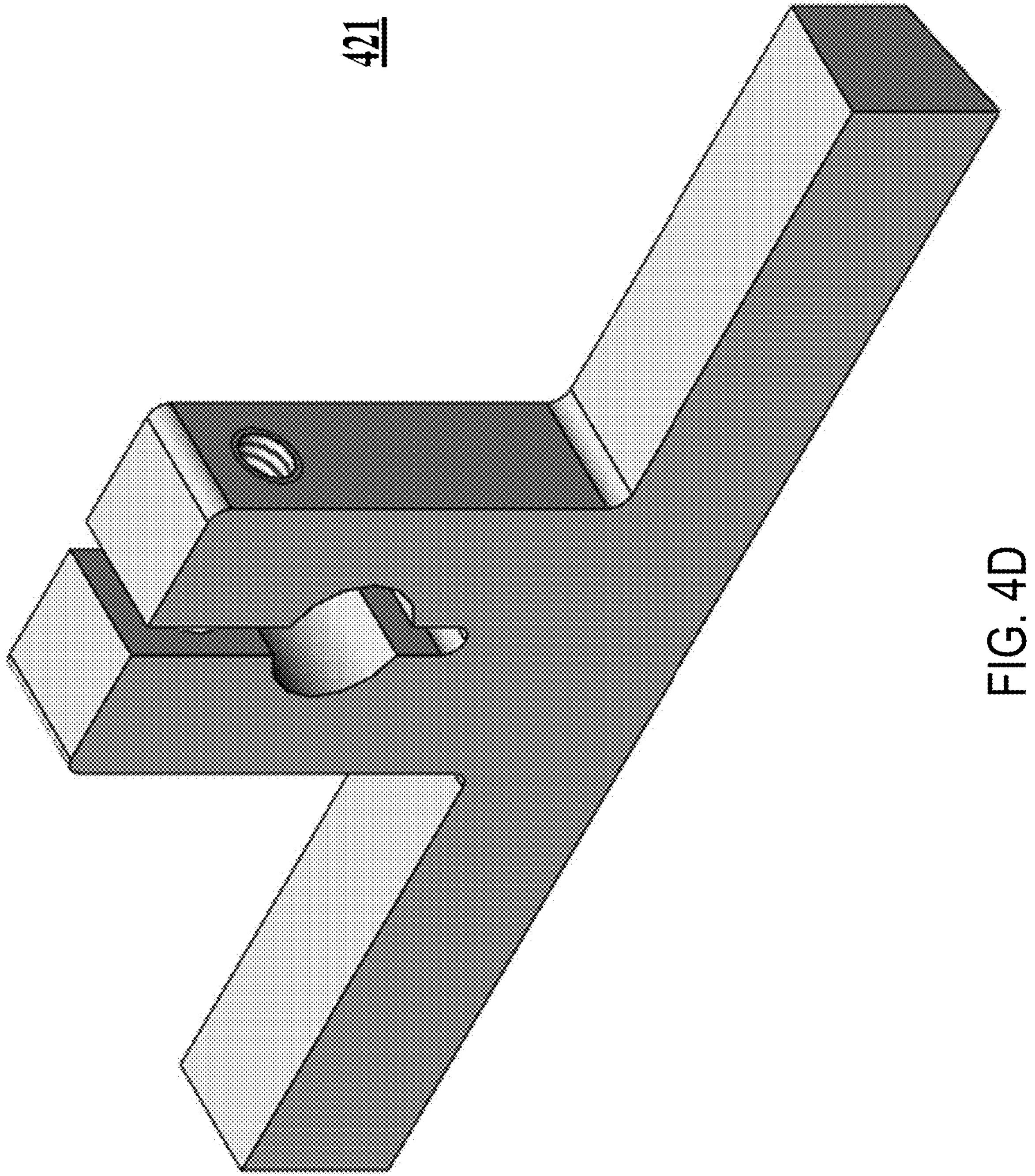

FIG. 4D shows another example singulation guide bar 421 embodiment with a straight geometry and no scallops. Such an example arm would not have any geometric features or embellishments but could be angled in order to help singulate stones on the rotating table as described herein. In some examples, the guide bar 421 may be in communication with or otherwise connected to a motorized pivot system as shown in FIG. 5B to pivot in relation to the spinnable table as described. In some examples, any of the shaped guide bars may be mounted in such a way as described herein.

In some examples, the guide bar 421 may be 0.3 inches deep. In some examples, the guide bar may be 3 inches long. In some examples, the chamfer on the bottom of the guide bar may be at a 15 degree angle from horizontal. In some examples, the guide bar may be 0.36 inches tall. These dimensions are mere example dimensions and could be 10%-20% larger or smaller depending on the implementation.

Figure 4E:
Figure 4E:
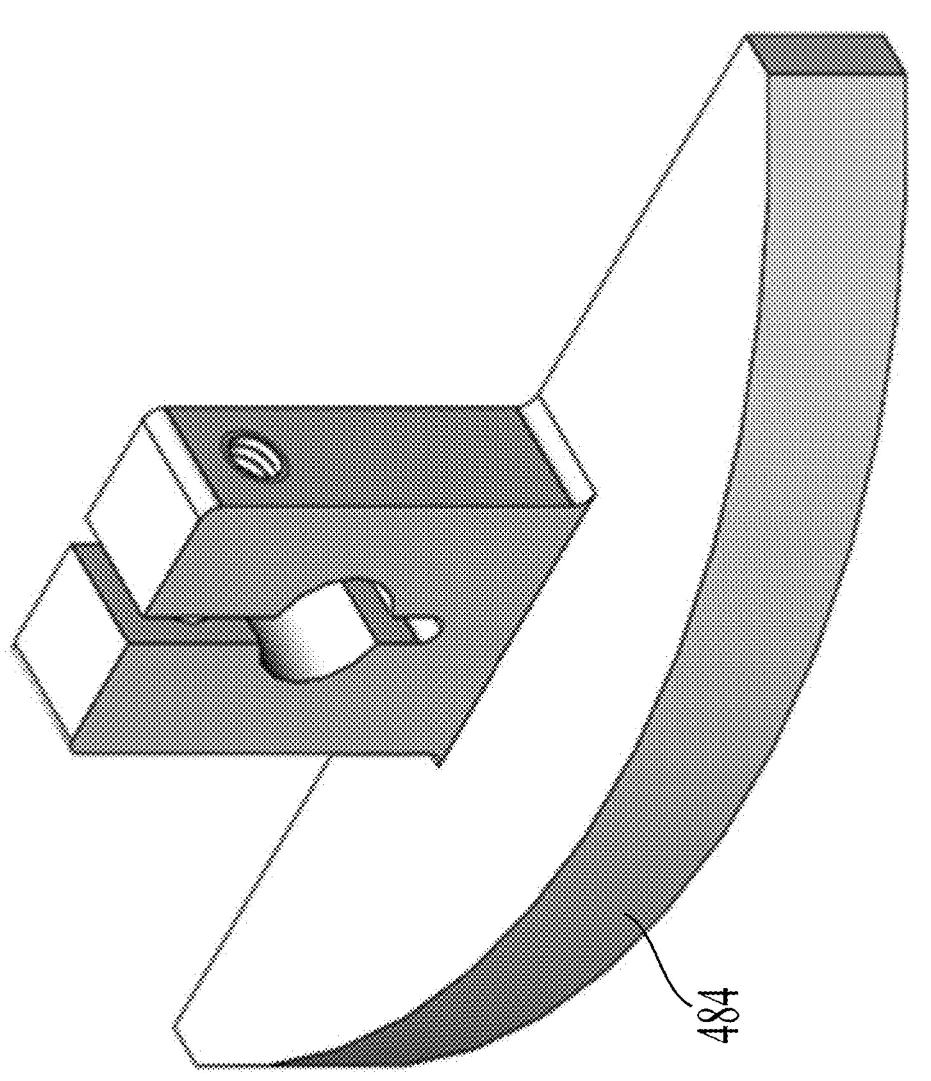

FIG. 4E shows another example singulation guide bar 427 geometry. Such a rounded geometry 484 may help ensure the stones are in the same radial position on the table as shown in FIG. 5 B-5C. In some examples, the guide bar may be 0.795 inches deep. In some examples, the guide bar may be 3 inches long. In some examples, the guide bar arc portion may be from a curve that would have a 2 inch radius. These dimensions are mere example dimensions and could be 10%-20% larger or smaller depending on the implementation. In some examples, a short flat portion on either side of the arch may be 0.118 inches long.

Figure 4F:
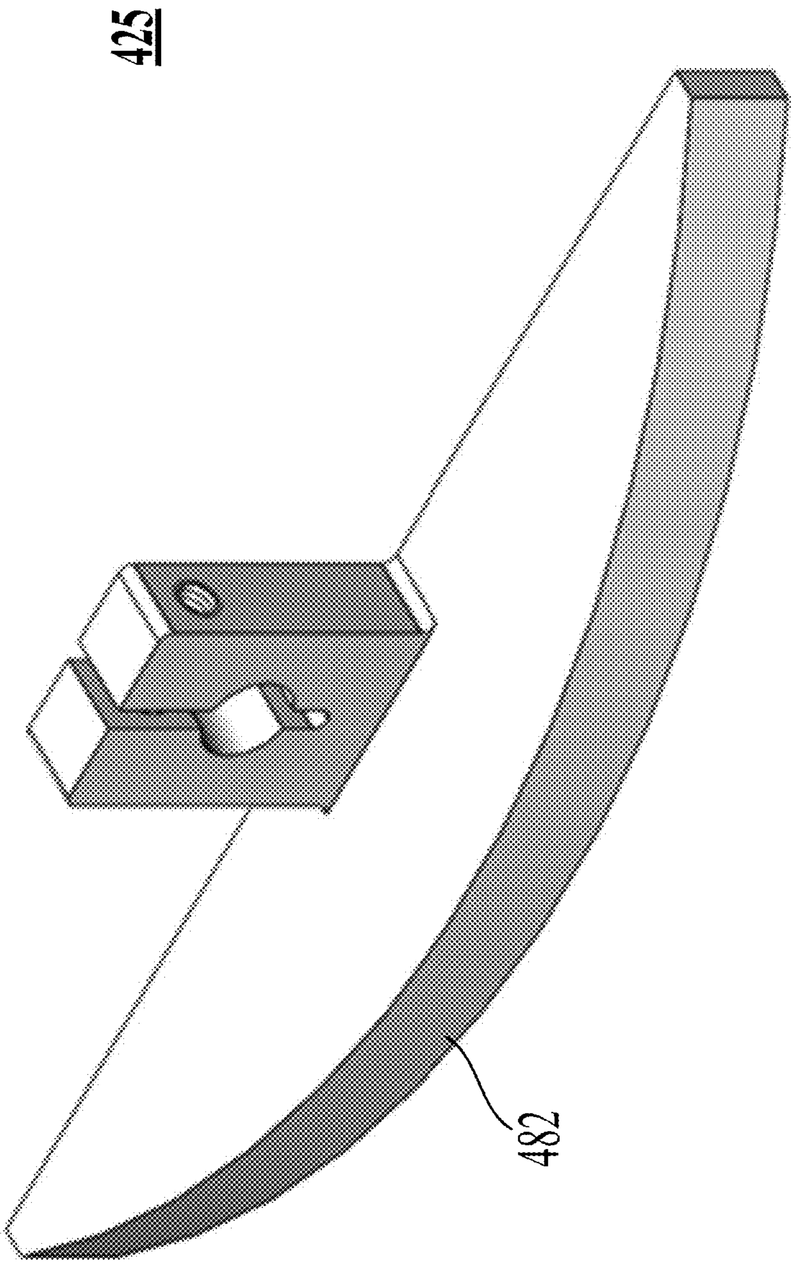

FIG. 4F shows another example singulation guide bar 425 geometry. In such example, the guide bar includes a rounded geometry 482. Such a shape may help ensure the stones are in the same radial position on the table as shown in FIG. 5 B-5C.

In some examples, the guide bar may be 0.36 inches tall. In some examples, the guide bar may be 1 inch deep. In some examples, the guide bar may be 5 inches long. In some examples, the guide bar arc portion may be from a curve that would have a 4 inch radius. In some examples, a short flat portion on either side of the arch may be 0.118 inches long. These dimensions are mere example dimensions and could be 10%-20% larger or smaller depending on the implementation.

Singulated and Spaced Examples

After orienting the gemstones as shown in FIG. 4A, table side down, the gemstones can be singulated. Singulated gemstones can comprise gemstones being oriented and separated by a separation distance for individual analysis as the table spins.

Figure 5A:
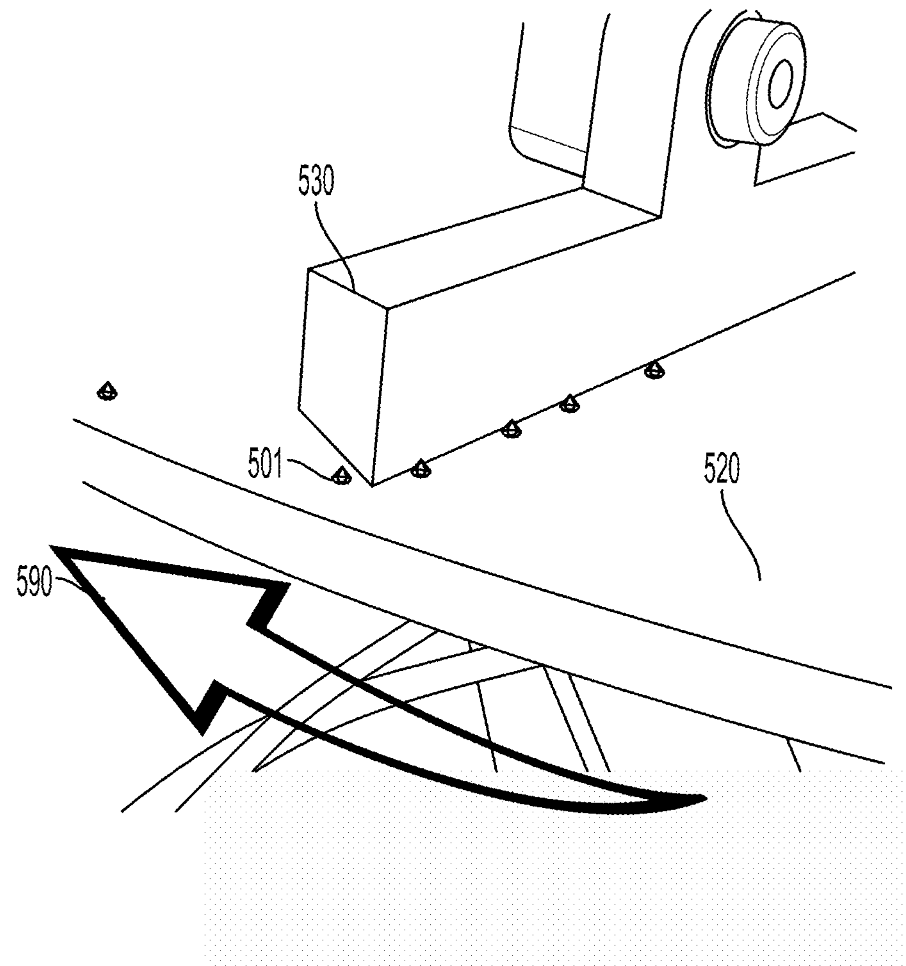
FIGS. 5A-D are illustrations of example singulation systems and arms in accordance with certain aspects described herein.
Figure 5B:
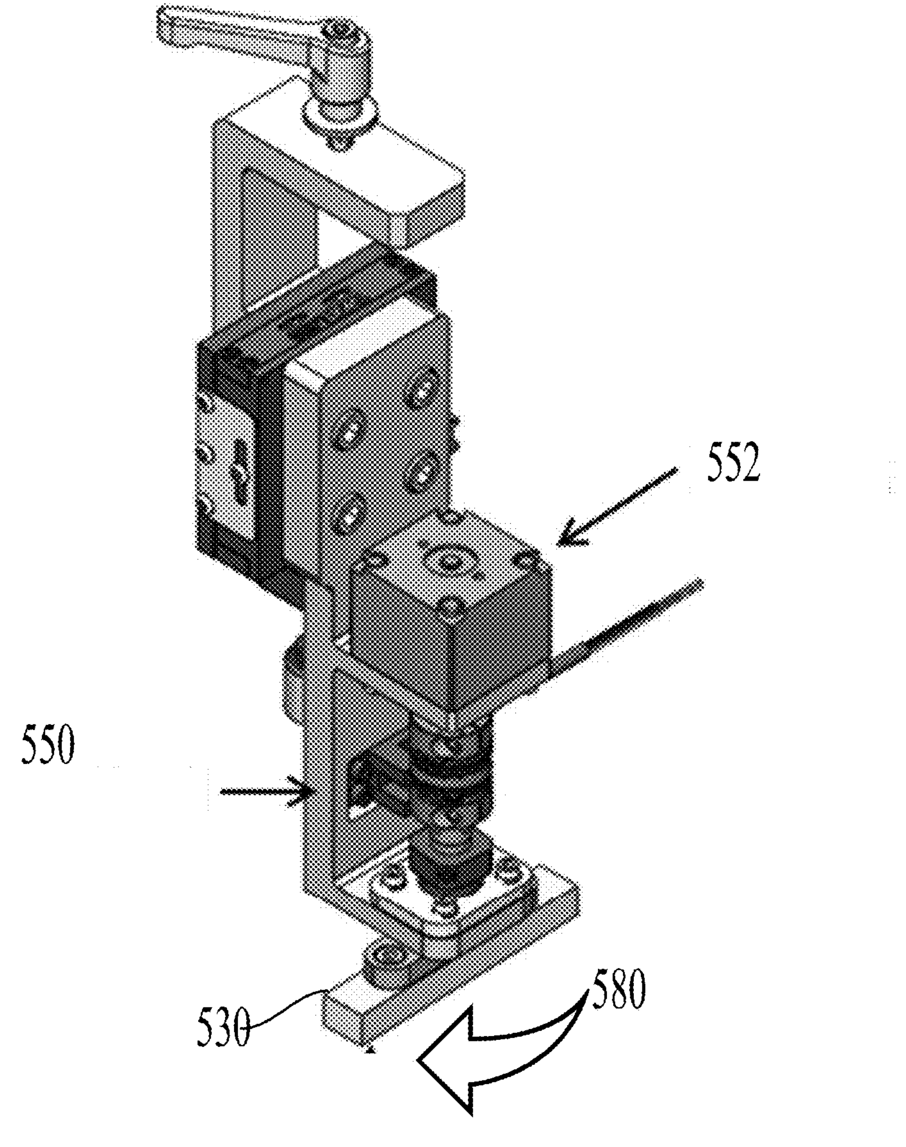

FIG. 5A illustrates an example of singulated gemstones 501 as the table 520 rotates 590 and the arm 530 interacts with the gemstones 501. In the example of FIG. 5A, a final straight sorting guide 530 can be angled on the table 520 such that when the table rotates 590, it pushes the gemstones 501 up the angled guide bar 530 and eventually off the last guide arm 530.

The rotating table then keeps the gemstones 501 moving after they leave the guide bar and end up spaced out and properly positioned as they move around the circulating table 520. The straight arm of FIG. 5A, 530 could be replaced by any of the other example structures as shown in example FIGS. 4B-F such as a curved sorting arm may be used as described in FIGS. 4E and 4F.

FIG. 5B is an example guide bar subsystem with a motor 552 attached thereto with an encoder 550 in order to pivot 580 or spin the guide bar 530 to change the angle of the guide bar as needed. Such a motorized rotatable guide bar may help to ensure a desired stone flow rate/spacing for different sized stones as the angle of the guide bar 530 may dictate the spacing of the stones as they rotate on the table and interact with the individual guide bars as described herein. It may allow quick adjustments, changes to the system and allow a user or program to correct for singulation discrepancies or consistency of spacing.

Such a motorized arm may include a motor 552 and an encoder 550 attached to a guide arm 530. The geometry of the guide arm could be any of those shown in FIG. 4A-4F. Such an arrangement may allow for the movement of the guide bar 530 by rotation in the arm. This movement may allow for different angles of the guide bar to be presented on the rotating table, to help change the distance between singulated stones as the table rotates as shown in FIG. 5C.

Figure 5C:
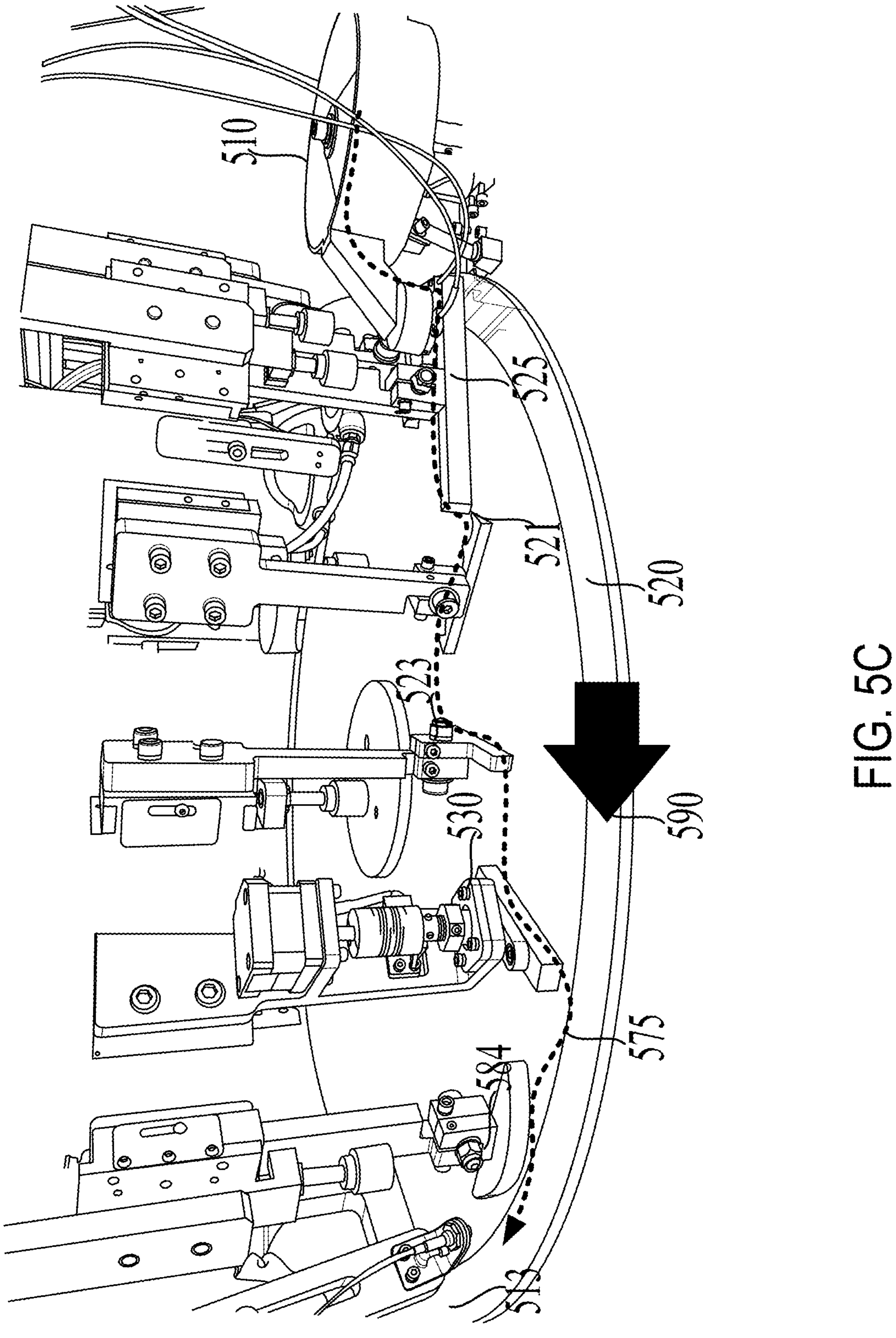

FIG. 5C shows a full picture of the table 520 the bowl feeder 510 and a number of examples sorting arms arranged around the table so that when the table rotates 590 the stones are moved around each and interact with each to achieve the singulation as described herein. The dashed line 575 shows how a stone may make its way through the guide bars and end up singulated on the rotating table.

First, the bowl feeder 510 drops the gemstones through a hole in the fist guide bar 525 as shown in FIG. 3B. The gems then move to a second spaced guide bar 521 that may include the scalloped edges as shown in FIGS. 4B and 4C. This guide bar 521 may help orient the gemstones table side down on the table 520 and also start the spacing process. As the table 520 moves 590 the gemstones next interact with another guide bar 523 and then another 530 to help space them out as they rotate. In some examples one or more of these guide bars or any of the guide bars, may be motorized as described in FIG. 5B. Such an arrangement would allow for an operator or the system to quickly adjust the angle of the guide bar 530 and pivot it in order to help change the spacing of the gemstones as they continue to progress. Next, the gemstones may interact with one last guide bar, in this example, the curved guide bar 584. Such a guide bar is shown as an example in FIGS. 4E and 4F. After this guide bar, the gemstones may be singulated and spaced on the table 520 at a particular distance from the edge of the table 520 for the various testing stations to interact with them. In some examples, a camera 513 is positioned in order to capture a digital image of the gemstones as described in FIG. 6 for spacing and alignment purposes. In some examples, this may also include identification analysis.

In an example embodiment, a minimum spacing for a UV-vis probe can be around 6 mm between gemstones. Further, a minimum spacing of stones at an ejection pin can be around 2.5 mm. A natural stone refer rate, a percentage of stones that can be incorrectly referred as if they are synthetic, can be around 5%, and in some examples less than 5%. A throughput per batch can be around 1 stone per second and a stone size, such as the diameter of stone girdle for round cut, of between 0.8-4 mm. A maximum stone diameter deviation per batch can include 0.5 mm above and/or below for each of a 0.8-4 mm. A stone cut can include a round brilliant stone, and a stone type can include a diamond, ruby, and/or blue sapphire, merely as non-limiting examples. The stones can be cleaned (e.g., acid cleaned) before analysis. A stone-equilibrium rate can include the average per-stone measurement time after the first batch of group of stones have been dispensed from the bowl-feeder, passed through the sorting guides, and reach the UV-Vis measurement probe.

In some instances, the gemstones can be spaced according to a minimum spacing for ejection. The sorting guides can be used to determine a radial position and stone to stone spacing. For example, the spacing can be between 6.2-7.8 mm, or between 5-8 mm. The stones can be positioned around 3.8 mm from an ejection nozzle, with an air ejection ON duration set to around 100 ms.

Pressurized Air System Examples

In some example embodiments, pressurized air may be used in different ways on the system to move gemstones. Such pressurized air may be generated from an air compressor attached to a hose or line through which air may flow and a valve which may be opened or closed by manual or computerized command.

Figure 5D:
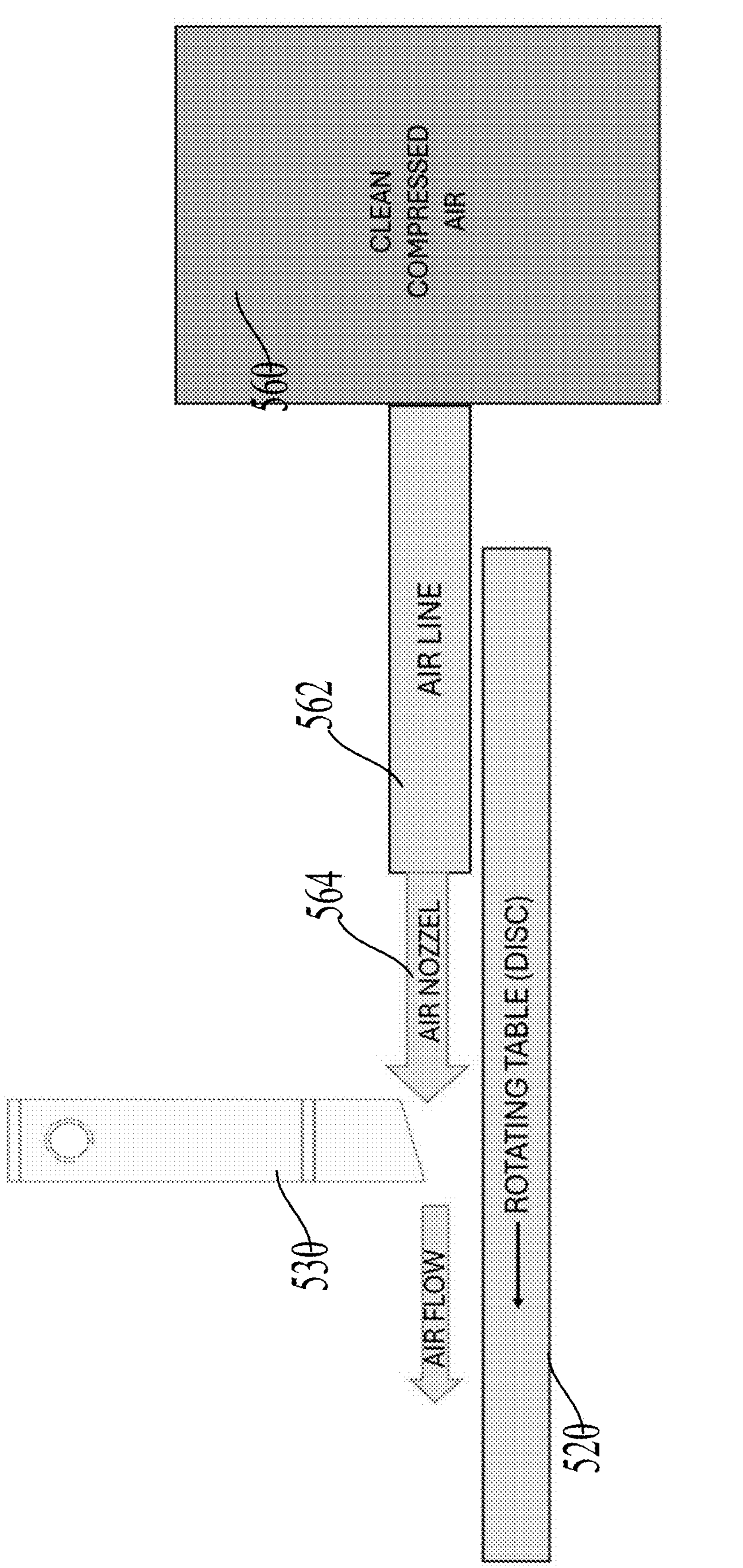

In some examples, such pressurized air may be used to help clean the table and the guide arms and thereby keep the melee gemstones free of debris. FIG. 5D shows a side view diagram of the table 520 and one guide bar 530. In the example arrangement of FIG. 5D however, an additional air compressor or blower 560 is shown with an exhaust or air line 562 and nozzle 564 to direct pressurized air flow under the guide bar 530 and between it and the table 520. Such an arrangement may supply positive air pressure under the singulation guides to help remove trapped particles such as dust and debris and ensure continuous stone flow on the rotating table 520. Such a system may be incorporated as a cleaning mode as well before running stones on the table as required, as part of a calibration process, or in between loads in order to help maintain the cleanliness of the system.

In some examples, an overall enclosure of the melee sorting device may be constructed to prevent dust attaching to the table/guide bars, etc. In some examples, there may be a small gap between guide bars and the rotating table, where unwanted dust and debris might block or interrupt the flow of stones around the testing stations. Such a blocking effect can be seen for varies of different sizes but may be especially visible for stone size smaller than 1.2 mm.

In some examples, a high efficiency particulate air (HEPA) filter-based positive air-filtering system may be used for the enclosed system in order to keep dust and debris out of the system. In such methods, an air compressor or air blower may push air into the system and utilize a HEPA filter to remove unwanted particulate matter. In such examples, the air may be blown into the enclosed system by way of air ducts to supply positive air pressure to the enclosure and prevent dust and fiber particulate matter from contaminating the system.

Camera Detection

Turning back to FIG. 1, after the bowl feeder 110 drops the gemstones onto the table 102 they then interact with the guide singulation arms 112 to be placed in a row for evaluation under any number of testing arrangements. In some examples, as shown in FIG. 1 a first substation that the gemstones pass under may be a photo position detection subsystem 114 comprising one or more cameras configured to capture images of the first gemstone and a computer vision model configured to process the captured images of the first gemstone and determine an actual orientation of the first gemstone.

Such a position detection system 114 may include one or more cameras part of a system to identify various aspects of the singulated gemstones. This is also shown in FIG. 5C as 513 camera after the guide arms. The function of the camera based position detection system 114 may be used to capture a set of digital images of gemstones that are on the table which will allow the system to determine if the stones was correctly positioned/spaced in terms of radius position on the table to interact with the various testing components. In some examples, such digital pixelated image data may be analyzed to see if the stone diameter matched the information provided by operator, for example, it suppose to a batch of 1 mm stone and suddenly a 3 mm stone popped up. Also the image analysis may help determine if the stone is table down and/or if the singulated stones are correctly spaced out, for example, if two stones are attached together or the space is too small, they may not be correctly spaced for testing analysis as described herein. Image analysis may also be used to help determine if anything in the stone sorting/spacing process is not successful.

If the image camera system 114 detects any problem as mentioned above, the system may be programmed to avoid screening those stones. Those problematic stones will either directly go through the sorting process again or being ejected from the system and labeled as undetermined and/or re-fed back into to the system after proper cleaning/identification as described herein.

A set of images can be captured for each gemstone and processed by an imaging processing system that is part of position detection subsystem 114 to determine an orientation and position of each gemstone.

In some instances, the position detection subsystem 114 can generate an alert, or trigger a specific action at the system 100, responsive to determining that a gemstone is in an improper position or not within various separation parameters. In such a way, the system may eject misaligned stones to be re-fed into the system later, as described herein.

Further, a position detection subsystem 114 in FIG. 1 can be used to capture images of the gemstones and determine a separation and orientation of the gemstones responsive to singulation, singulated gemstones 501 in FIG. 5A-5D.

Figure 6:
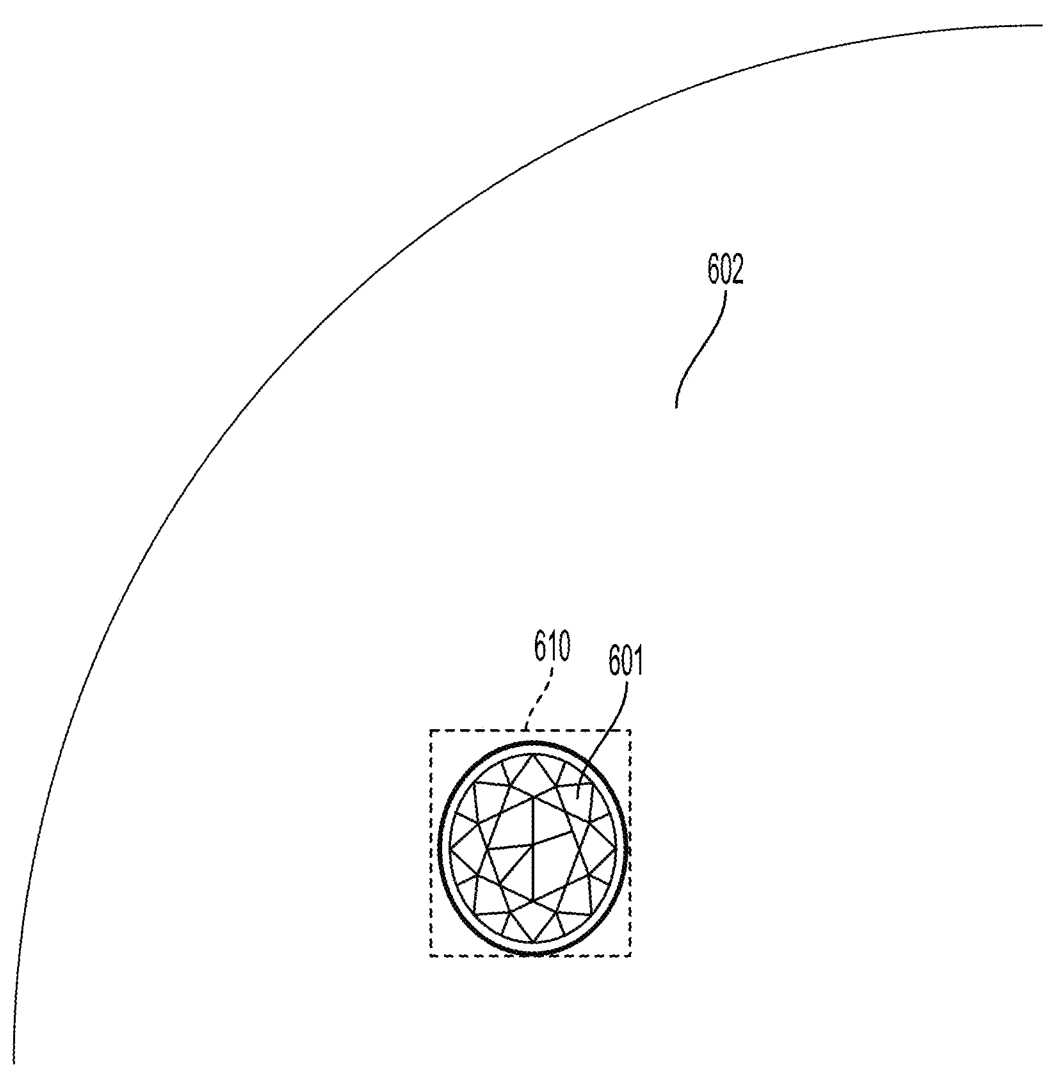
FIG. 6 is an illustration of an example position identification output in accordance with certain aspects described herein.

As described in FIG. 1, once the stones are singulated via singulation subsystem 112 on the table 102, they may first pass under a vison system camera position detection system 114 as described in FIG. 6. With data from the table rotation encoder and the vision system, control software in communication with the camera digital image capture systems may assign positional coordinates for each imaged gemstone. These coordinates may be used for positioning the other measurement instruments as described and the ejection air nozzle. The measurement instruments, such as UV VIS fiber, may be aligned so that they are positioned over the desired region of the gemstone when the gemstone passes under that measurement station and a measurement is taken.

FIG. 6 further illustrates an example position detection subsystem image where the position detection subsystem be captured from the camera system comprising one or more cameras for capturing images of a gemstone 601 on the table 602 and an automated computer system analyzing one or more captured digital image from the camera(s) to identify the gemstone 601 and various aspects of each sample gemstone. In the example of FIG. 6, a virtual box 610 can be drawn by the computer system on a captured digital image to determine a position and also be used to determine measurements of the gemstone and, in some instances, to indicate a good identification of the gemstone 601. Such analysis may be accomplished by pixel counting, image measurement based on geometry and distance of the camera to the table and gemstones, or other example image processing systems and methods. In such examples, the computer system in communication with the cameras may keep track of which individualized stones moving around the circulating table are which, so when the modular testing is completed, the computer knows which stone the analysis data applies so it may properly sort the stones at the sorting stage. This may be by counting the gemstones as they come off the singulating arm, image comparison for analysis or other method.

Image capture and comparison by the system may be used by the system to determine if the gemstone is in proper orientation for testing, as described. In some examples, artificial intelligence software may be used to make the determination if the gemstone is properly oriented, its identification, size, etc.

Refeed Examples

In some instances, proper spacing of gemstones on the table may also analyzed and addressed by the computerized systems and methods including by using the camera detection system in FIG. 1 and FIG. 6. For example, if one or more gemstones are not properly spaced or improperly oriented on the table, such as a cluster of stones without proper spacing, or a turned over stone, the different analysis tools may not be able to properly analyze the gemstones. In such examples, the computer may identify these problems by image analysis, and may send instructions to the re-feed system to re-feed clustered gemstones back into the system via command to the compressor an nozzle arrangement that results in a burst of compressed air from a pneumatic pressure valve and nozzle to remove or push them off the table and capture them in a receiver to recycle them through the system again before the analysis begins. The refeed-tagged stones may continue to be fed back into the original sorting path for regular analysis.

Figure 7:
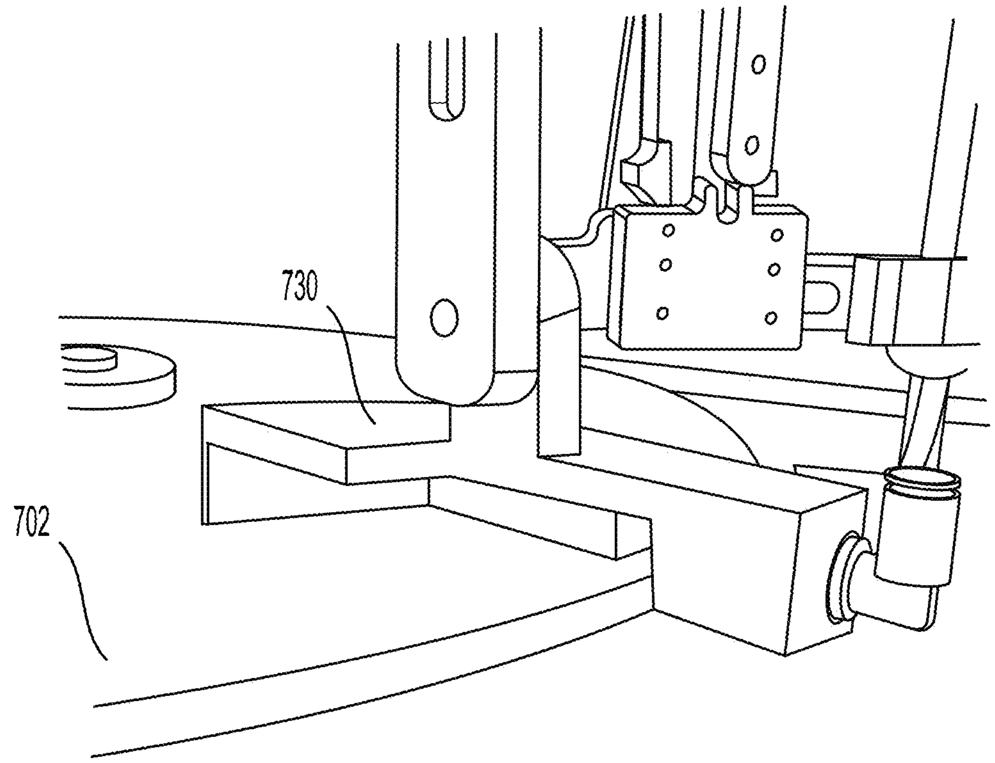
FIG. 7 illustrates an example re-feed subsystem in accordance with certain aspects described herein.

FIG. 7 illustrates an example re-feed subsystem. In some embodiments, a re-feed subsystem can be disposed adjacent to the position detection subsystem 114. Further, the re-feed subsystem can be configured to obtain an instruction to remove a gemstone, for example, from computing device(s) associated with position detection subsystem from the table and image analysis as described. For instance, an air pressure valve can provide a burst of compressed air to remove a gemstone from the table 702 similar to the arrangement for sorting into bins as described below. In some instances, a bin can receive any removed gemstones to be re-fed into the first bulk feeder 110. In some examples, the re-feed subsystem comes after a sorting subsystem 124 in FIG. 1. In such examples, the gemstones that are tagged by the computer for re-feed will pass through all other subsystems with no control action taken until the re-feed station.

In some examples, the set of systems can include a re-feed subsystem including a first air burst element. The re-feed subsystem 730 can be configured to, responsive to a determination by the computer vision model that the orientation of the first gemstone is outside a threshold orientation range, receive an instruction to eject or otherwise remove the identified gemstone. In some examples, alone or in combination, the re-feed subsystem may operate by moving onto the table for a mechanical arm sweep to guide a gemstone off the table and/or include a pneumatic burst of air by the air burst element to the gemstone, thereby directing the gemstone to a bin disposed outside of the circular table 702. The refeed system in FIG. 7 may then be distanced from the table 702 when not instructed to remove one or more gemstones into the refeed option.

Modular Testing Examples

As shown in FIG. 1, as the table 102 is configured to rotate and present gemstones below different subsystems arranged, placed, positioned, or otherwise constructed around the table subsystems 116, 118, 120, 122, such that a line of gemstones, singulated by the sorting arms 112, can encounter each subsystem one at a time as the table 102 rotates in direction 104 for individual analysis. Each of the subsystems can include various sensors to capture aspects of the gemstones, receive testing data, and/or otherwise analyze each gemstone. In some examples, each analysis subsystem sends data directly to a local computer system for analysis and determination for sorting. In some examples, the analysis data may be sent to an off-site cloud computing system for analysis and determination for sorting. In any arrangement, the computer determinations may be made and sent to the local pneumatic sorting system as described therein.

Examples of modular testing equipment may include, but is not limited to, diamond, ruby and/or blue sapphire stones with UV-VIS spectrometry. Systems for testing systems including digital image analysis techniques can be used to evaluate the quality of gemstones based on their size, cut, clarity, color, and authenticity. Other analysis techniques may include determining whether clarity enhancement techniques are used on a gemstone, such as fillers, oils, resins, or other compounds or chemical, such as those used to help emeralds. Cameras can capture image(s) of a gemstone, which can be fed into a computer vision model implemented at a computing device or series of interconnected computing devices to derive metrics of the gemstone for example, a size, clarity, color of each gemstone.

Computer vision techniques may process images of the gemstone facets to determine quantitative metrics that may be used to make the gemstone evaluation process more accurate and consistent relative to manual analysis. Features extracted from digital images may also be used to distinguish gemstones composed of natural materials from samples made of synthetic compounds and identify a particular graded gemstone from other similar looking samples.

The accuracy and repeatability of these techniques for digital image analysis may be dependent on the quality of the images that are used for analysis. To capture high quality images that clearly capture the features of gemstone sample and have sufficient resolution and contrast to view a table reflection and other difficult to see features, each sample can be aligned with the one or multiple cameras capturing the images of the sample. For example, the sample may need to be in focus and can include an orientation that is aligned with the one or multiple cameras. Other testing systems may be implemented using testing hardware as indicated such as image sensor, UV-Vis, Raman Probe, laser-induced photoluminescence analysis, etc.

The metric or testing subsystems can be configured to generate, by each of the one or more metric or testing subsystems, data relating to each gemstone. The metric or testing subsystems can be further configured to derive, for each of the one or more metric subsystems, one or more metrics using the data generated by each of the one or more metric subsystems. The metric or testing subsystems can be further configured to derive an evaluation metric or test data for the first gemstone based the derived metrics for the first gemstone. In some instances, any of the set of metrics or testing subsystems include one or more testing systems configured to capture the data relating to the first gemstone and a metric generation model configured to process the data to determine at least one metric of the first gemstone. The at least one metric can include a value specifying any of a size, a weight, a cut type, a clarity, an origin, a natural origin or synthetic origin, and a color of the first gemstone. This data including image data and testing data can be stored for future use as well as for determining which bucket to sort each of the gemstones as described.

For example, any number of subsystems 116, 118, 120, and 122, labeled for non-limiting example purposes only, can include various hardware systems for performing measurements of gemstones, using computer-vision techniques to determine quantitative metrics of the gemstones to derive evaluation metrics of each gemstone. In some examples, these subsystems may be modular and removable or replaceable. In some examples, they may be upgradable. For example, subsystems 116, 118, 120, and 122 can implement any number of cameras, Raman probes, lasers, or any other kind of device(s) for gemstone analysis. Other examples may utilize a camera under different lightening environment such as diffused white light, directional light, LWUV LED, SWUV LED, Xe flash lamp, Raman probe, Reflection probe for fluorescence measurement, Reflection probe for UV-VIS absorption measurement. Further, any of the subsystems as described herein can electrically communicate with one or more computing devices to perform processing as described herein. In such examples, the hardware may simply be plugged into a computer interface of the system here for sending and receiving data to the main system computer as described herein.

Figure 9:
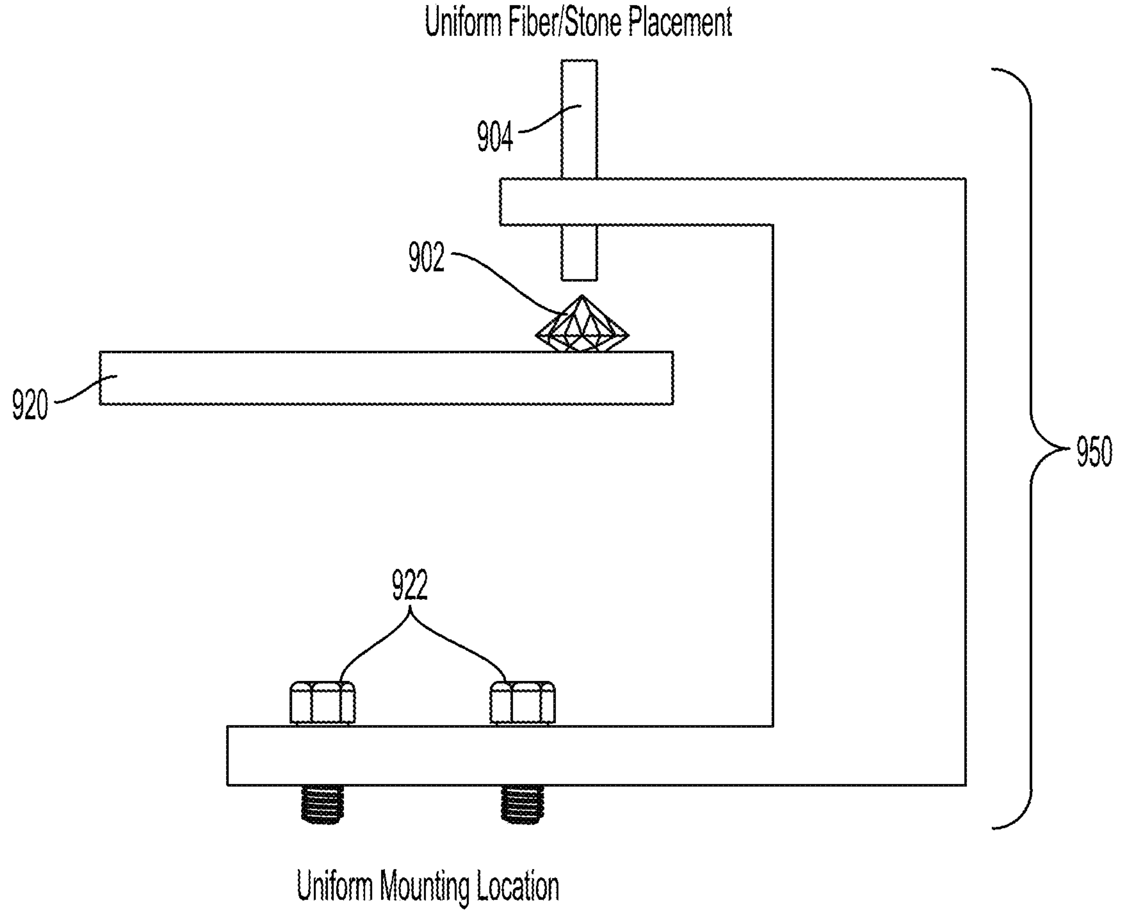
FIG. 9 is an illustration of an example side view of the table arrangement with modular testing systems in accordance with certain aspects described herein.

In some instances, the gemstone can be disposed directly below one or more sensors for any of the metric subsystems around the rotating table. FIG. 9 illustrates an example position of a stone 902 resting on the rotatable table 920 below a fiber element 904, from a side view. The fiber element 904 can be connected to sensor devices to capture data relating to the gemstone as described herein. Any kind of described analytics tools or sensors may be mounted in such a way, so when the singulated gemstones 902 rotate on the table 920 and come under the sensor 904, the system may analyze the gemstones 902 one at a time, automatically. In some examples these testing or analytics stations 950 may include a standard or uniformly arranged mounting location 922 which are configured to extend around and up over the edge of the rotating table 920 such that they may be removed, swapped, changed, rearranged, or otherwise modularly configured. See also FIG. 1 showing a top down view of various testing or analytics stations 116, 118, 120, 122, 124, etc. In some instances, one or more sensors can be used to detect the presence of a gemstone as it passes by on the rotating table 920. The sensor can be a gate sensor configured to trip when a gemstone is at a specific location or breaks a light source generated by the sensors.

In some examples using UV-Vis analysis for example, the camera system can obtain a set of pixelated digital images of gemstones that are laid out on the table. In some instances, an optical setup for the camera setup can have one or more spectrometer slits, such as two slits with a 25 um wide slit and a 50 um wide slit. A probe can be positioned around 3 mm above a gemstone, and an integration time can be varied from 10 ms to 50 ms.

Figure 10:
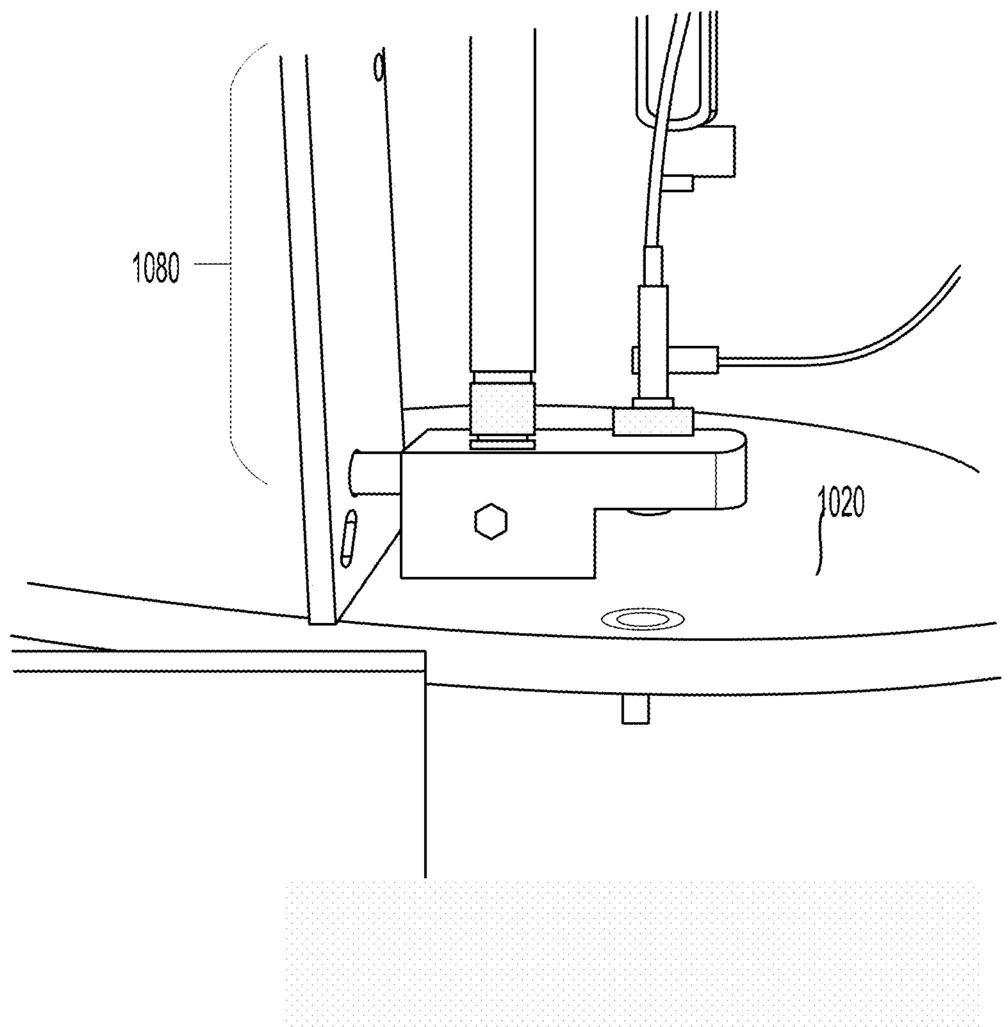
FIG. 10 is an example modular testing system and table in accordance with certain aspects described herein.

FIG. 10 shows an example hardware testing setup that could be placed at any of the substation areas 116, 118, 120, and 122 are described. In this example, a UV-Vis subsystem may be arranged at one of the stations around the table 1020 with hardware 1080 fixedly placed and used to interact with a gemstone that might pass below on the rotating table 1020.

Subsystems described in previously filed patent applications may be utilized here along with or in combination with, any other analysis system, for example those described in any or all of: U.S. Pat. No. 9,953,406 Automated System and Method for Clarity Measurements and Clarity Grading; U.S. Pat. No. 8,402,066 Method and System for Providing a Clarity Grade for a Gem; U.S. Pat. No. 8,120,758 Fast UV-VIS-NIR Absorption Spectrometer System and Method; U.S. Pat. No. 9,678,018 Apparatus and Method for Assessing Optical Quality of Gemstones; U.S. Pat. No. 10,107,757 Apparatus and Method for Fluorescence Grading of Gemstones; U.S. Pat. No. 10,684,230 Device and Method for Screening Gemstones; U.S. application Ser. No. 17/200,706 Image Assisted Scanning Spectroscopy for Gem Identification; U.S. application Ser. No. 17/332,513 Luminescence Imaging for Gemstone Screening; U.S. application Ser. No. 17/105,065 Fluorescence Imaging of Gemstones on a Transparent Stage; U.S. application Ser. No. 17/200,706 Imaging Assisted Scanning Spectroscopy for Gem Identification; U.S. application Ser. No. 17/382,317 Ultraviolet Visible Absorption Spectroscopy for Gemstone Identification; U.S. application Ser. No. 17/555,241 Measurement and Characterization of the Effect of Blue Fluorescence on the Appearance of Diamonds, all of which are hereby incorporated by reference in their entirety. In response, the system as described herein can include a sensor bracket with sensors that can move up and down as one unit relative to the disc while the disc stage is rotating. The sensors can be mounted on a bracket that rests on the rotating disc stage and follow the up and down motion. This mounting method can eliminate relative movement between the sensors and the disc stage and keep the stones in a constant detection range and therefore would detect all stones regardless of the up/down stage fluctuation.

Extraction and Storing

The set of subsystems can also include a sorting subsystem configured to direct each of the gemstones to a sorting bin based on the derived evaluation metric for the individual gemstone. In such a way, the bulk melee gemstones may be sorted into subdivisions based on the analysis conducted at the various testing stations. These subdivisions may be based on any number of metrics or testing data such as natural/lab grown, carat size, color, treatment, cut, clarity, or any other metric or test data.

In some instances, a series of sorting bins comprising the first sorting bin can be provided at the sorting subsystems as shown in FIG. 1 as 124. Each sorting bin can correspond with a range of evaluation metrics corresponding to software programming that the system is able to label each gemstone after evaluation. The sorting subsystem can be further configured to obtain an instruction to direct the first gemstone at the first sorting bin 124. As noted above, various subsystems as described herein can obtain measurements of each gemstone, and the measurements can be processed to generate evaluation metrics for each gemstone. The evaluation metrics (e.g., a score) can be assigned to each gemstone. The sorting subsystem 124 can identify a bin that corresponds with evaluation metrics for each gemstone. Further, the sorting subsystem 124 can include a distributing element (e.g., an air pressure system) to distribute the gemstones into corresponding bins. For example, a pre-positioned air pressure system can be movably oriented to direct high-pressure air through a nozzle to the gemstone to distribute the gemstone into a corresponding bin. In some examples, one nozzle may move or rotate to direct the gemstones as described. An air compressor may be in communication with the nozzle and the computer may direct a valve to open or close depending on the computer analysis and thereby blow air to move the melee gemstone into the corresponding bucket or bin as described herein.

Figure 11A:
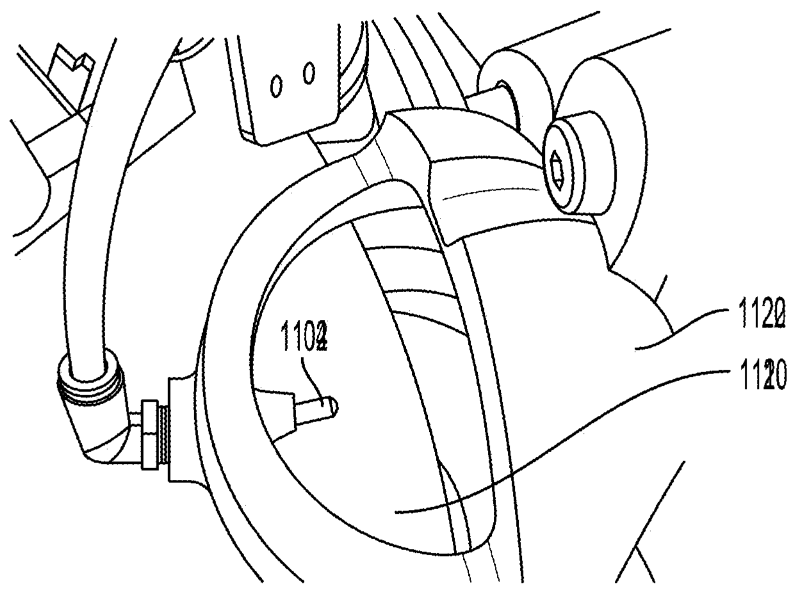
FIGS. 11A-B are an example sorting subsystem in accordance with certain aspects described herein.
Figure 11B:
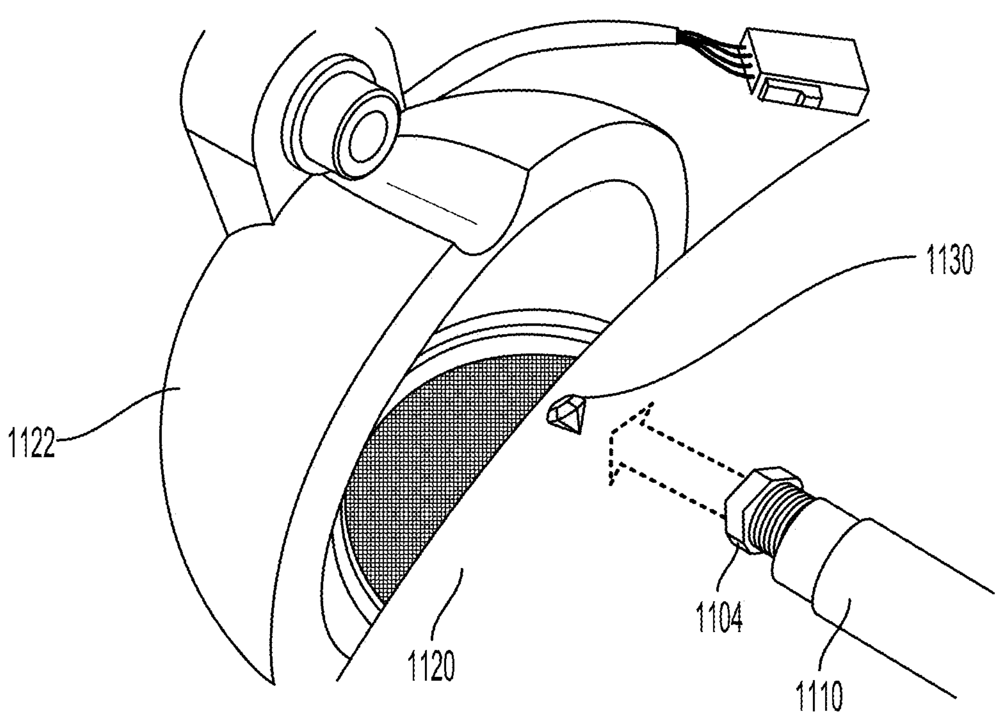

FIGS. 11A and 11B show a detail of an example air hose 1110 with a nozzle 1104 that may direct the pressurized burst of air toward a melee gemstone 1130 on the table 1120 and into a corresponding, preprogrammed bucket 1122. For example, a first bin can be designated for gemstones with a first evaluation metric range (e.g., for gemstones with highest evaluation metrics), while a second bin is designated for gemstones of a second evaluation metric range (e.g., gemstones with lowest evaluation metrics). In some examples, real or lab-grown diamonds may be separated. In some examples, those gemstones exhibiting fluorescence and those without may be separated. Any number of parameters or variables may be accounted for, programmed into the system as described herein, and utilized to separate the gemstones.

The sorting subsystem can also provide a burst of air using a second air burst element to the first gemstone, thereby directing the first gemstone to the first sorting bin of the series of sorting bins. To exit the table, the stones make their way around the circulating table to one or more pneumatic or air nozzle(s) and are blown into a bin, at the command of the computer after the analysis of any or all of the analysis subsystems. There can include multiple bins as needed based on the sorting parameters. For example, a sorting subsystem 124 in FIG. 1 can obtain an instruction to direct a compressed/pressured air burst at a gemstone to move the gemstone to a desired bin.

An example sorting system 124 can be shown with respect to FIG. 11A-B. Different nozzles 1102, 1104 may be prepositioned to direct the gemstones 1130 off the table 1110 with a pneumatic puff of air and into the corresponding bin 1120, 1122 depending on the computer assessment of the one or multiple evaluation systems as described herein. Such nozzles 1102, 1104 may be in communication with an air compressor and a computer operated valve such that the computer may open and close the valves to puff air and move the gemstones 1130 as described. In some examples, the system arrangement for FIG. 11A-B and description may also be used in the re-feeder examples described herein.

Method Step Example

Figure 12:
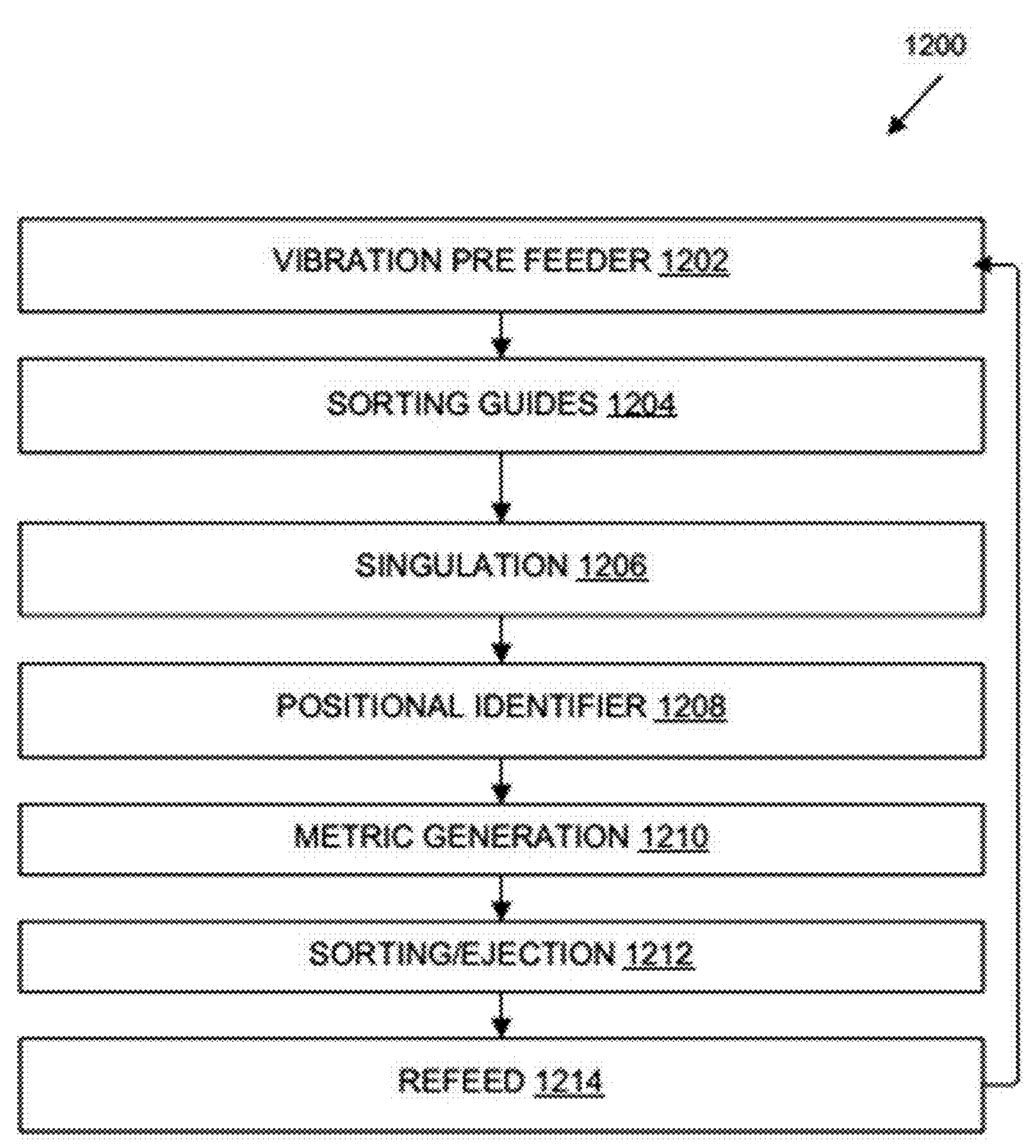
FIG. 12 is an example method for analyzing and sorting gemstones in accordance with certain aspects described herein.

FIG. 12 illustrates an example method for analyzing and sorting gemstones. The method can include receiving at least one gemstone (e.g., a melee gemstone) at a feeder subsystem at 1202. An example bowl feeder subsystem is described at 110 in FIG. 1. For example, one or more gemstones are provided at a vibration batch feeder at the bowl feeder subsystem to separate the gemstones for further processing as described herein.

The method can also include sorting the gemstones via sorting guides 1204 and performing a singulation process 1206. This can include orienting, by a singulation subsystem, the gemstone into a first orientation. The singulation subsystem 112 can include one or more arms that can separate the gemstones to at least a threshold distance from one another and orient the gemstones in a top-down orientation.

In some instances, at 1208, the method can include capturing images of the gemstone by one or more cameras of a photo position detection subsystem 114 of FIG. 1. Images of each gemstone can be captured to be processed and derive an actual orientation of each gemstone. The method can further include processing the images to determine an actual orientation of the gemstone. For example, a computer vision model a computer-implemented model implemented by a computing node of the photo position detection subsystem can process the images of the gemstone and derive an orientation of the gemstone. The computer vision model can determine whether the actual orientation of the gemstone is outside a threshold orientation range (e.g., a range of orientation values of the gemstone corresponding with a table-down orientation).

Responsive to determining that the actual orientation of the gemstone is outside the threshold orientation range, the computer vision model can provide an instruction to a re-feed subsystem FIG. 7 to eject the gemstone 1214. The re-feed subsystem can provide a burst an air by an air burst element to the gemstone to direct the gemstone to a bin disposed outside of the table.

The method can also include, at 1210, processing the gemstone by any number of testing or analytics platforms, such as a set of metric subsystems 116, 118, 120, 122 in FIG. 1. As described in FIG. 9, these testing subsystems may be modular or removable/replaceable as described to analyze gemstones as they move around the circular table and come under the testing or analytics sensors one at a time and in any successive order that the testing or analytics systems are arranged around the table. The feeder subsystem, the singulation subsystem, and the set of metric subsystems can be disposed about a singular table 102.

Processing the gemstone by the set of metric subsystems can include generating, by each of set of metric subsystems, data relating to the gemstone. The data relating to the gemstone can include images, absorption spectrums (e.g., captured by a UV-VIS spectrophotometer), etc. The data relating to the gemstone can be processed to derive metrics relating to the gemstone. The metrics can include a value (or a series of values) specifying any of a size, a weight, a cut type, a clarity, an origin, a natural origin or synthetic origin (e.g., whether the gemstone is natural or synthetic), and a color of the gemstone, as described herein or as incorporated by reference. In some examples, the systems and methods may be used to determine size, color and/or a natural origin or synthetic origin of a gemstone under evaluation as described herein.

Further, any of the metric subsystems can derive a metric or test data (e.g., an origin of the gemstone, a color of the gemstone, a clarity of the gemstone) based on the absorption spectrum of the gemstone.

The method can also include, at 1212, directing the gemstone to a first sorting bin based on the derived evaluation metric for the gemstone. For example, a sorting subsystem 124 in FIG. 1, can direct the gemstone using a burst of air into a bin that corresponds with the evaluation metric for the gemstone.

Network Examples

Figure 13:
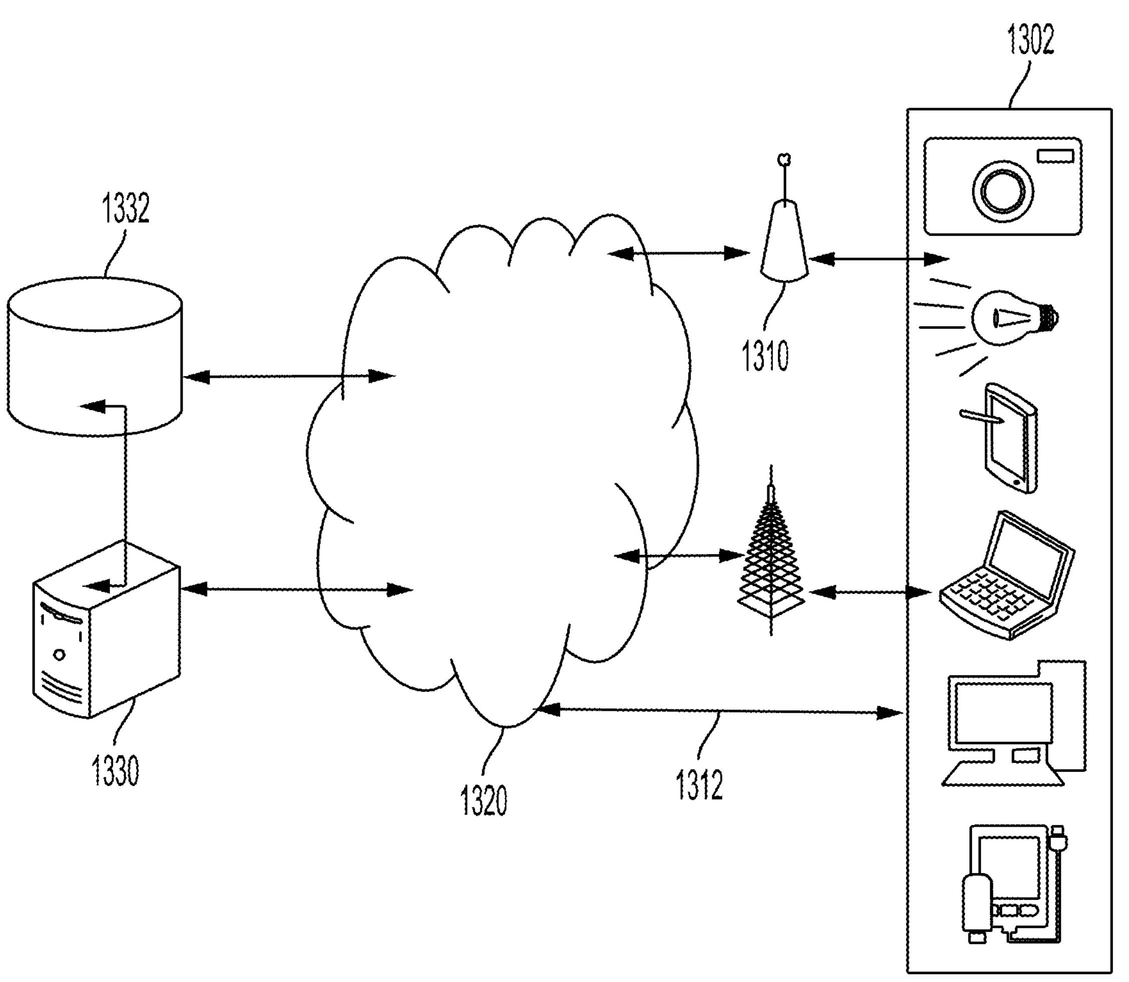
FIG. 13 is a computer network used with the systems and methods here in accordance with certain aspects described herein.

The present embodiments may utilize a networked computing arrangement, such as the arrangement as shown in FIG. 13. In FIG. 13, any of various computer(s) or computer components within other testing systems 1302 may be used to process the testing data of the testing data, send and receive instructions to the table motor(s), air compressors, or send and receive other data such as sample location, testing data of gemstones, identification information of the gemstones, time and date, etc. The computer 1302 used for these steps could be any number of kinds of computers such as those included in the testing systems, camera, and/or another computer arrangement in communication with the computer components including but not limited to a laptop, desktop, tablet, phablet, smartphone, or any other kind of device used to process and transmit digitized data.

In FIG. 13, the data captured for the gemstone testing data, stone sample identifying information, location, from whichever computer 1602 may be analyzed on a back-end system instead of or in addition to a local computer. In such examples, data may be transmitted to a back-end computer 1330 and associated data storage 1332 for saving, analysis, computation, comparison, or other manipulation. In some examples, communication between control systems and the hardware computer systems may use socket communication protocol. In some examples, additionally or alternatively, the transmission of data may be wireless 1310 by a cellular or Wi-Fi transmission with associated routers and hubs. In some examples, additionally or alternatively, the transmission may be through a wired connection 1312. In some examples, additionally or alternatively, the transmission may be through a network such as the internet 1320 to the back-end server computer 1330 and associated data storage 1332. At the back-end server computer 1330 and associated data storage 1332, the test data, calibration file, sample identification, sample location, time, date, may be stored, analyzed, compared to previously stored data for matching, identification, and/or any other kind of data analysis. In some examples, additionally or alternatively, the storing, analyzing, and/or processing of data may be accomplished at the computer 1302 which is involved in the original data collection. In some examples, additionally or alternatively, the data storing, analyzing, and/or processing may be shared between the local computer 1302 and a back-end computing system 1330. In such examples, networked computer resources 1330 may allow for more data processing power to be utilized than may be otherwise available at the local computers 1302. In such a way, the processing and/or storage of data may be offloaded to the compute resources that are available. In some examples, additionally or alternatively, the networked computer resources 1330 may be virtual machines in a cloud or distributed infrastructure. In some examples, additionally or alternatively, the networked computer resources 1330 may be spread across many multiple physical or virtual computer resources by a cloud infrastructure. The example of a single computer server 1330 is not intended to be limiting and is only one example of a compute resource that may be utilized by the systems and methods described herein. In some examples, additionally or alternatively, artificial intelligence and/or machine learning may be used to analyze the image data from the samples, align the sample with the camera and/or focus the imaging camera for use with stage movement. Such systems may employ data sets to train algorithms to help produce better and better results of imaging of samples, alignment of samples, analysis of samples, identification of focused samples, stage movement, camera movement, and the like.

Example Computer Devices

Figure 14:
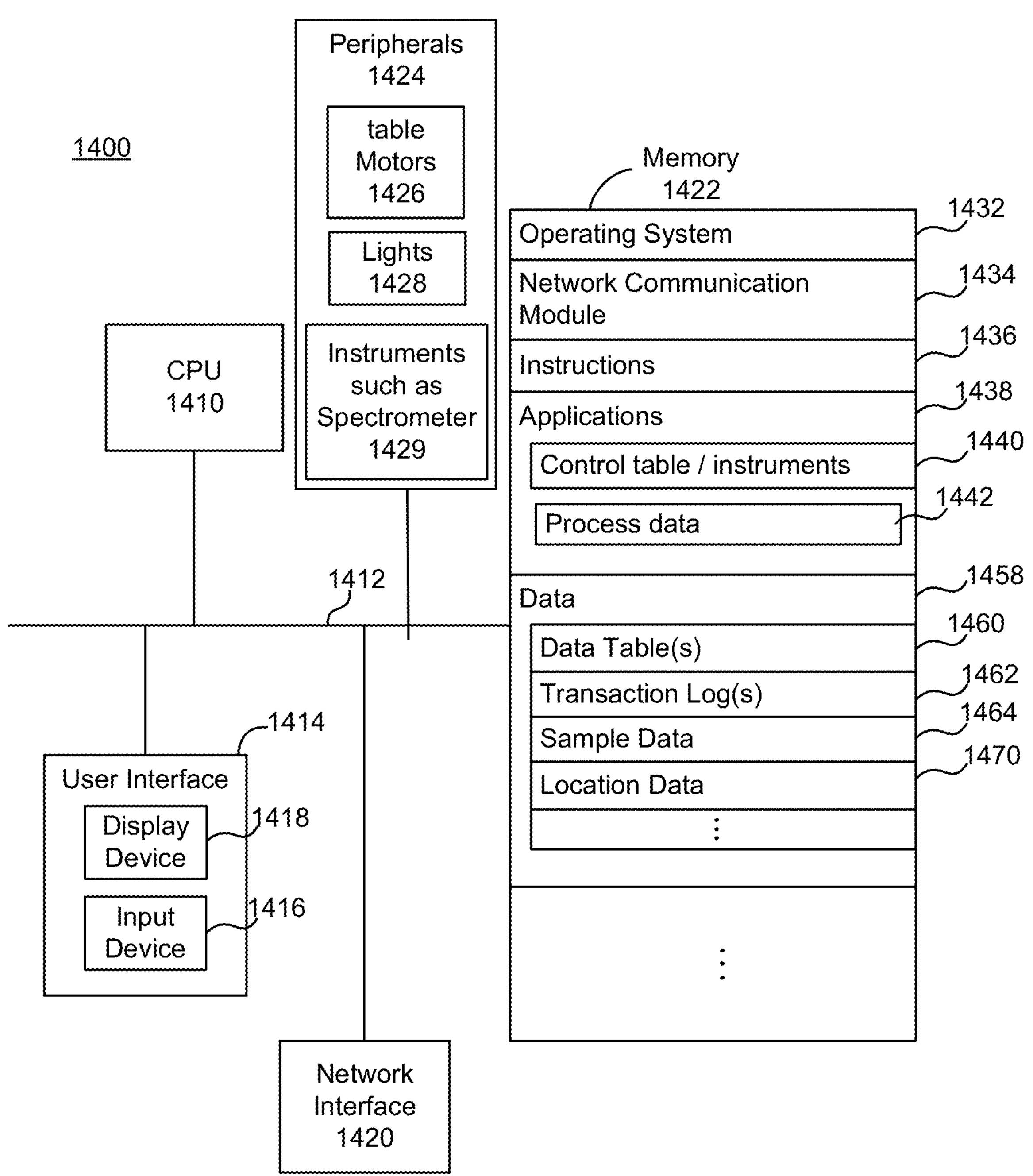
FIG. 14 is a diagram of an example computer system in accordance with certain aspects described herein.

FIG. 14 shows an example computing device 1400 which may be used in the systems and methods described herein, whether that be the overall computer commanding the table and sending commands to the individual testing substations, air compressors, and/or receiving testing data from the testing substations. In the example computer 1400 a CPU or processor 1410 is in communication by a bus or other communication 1412 with a user interface 1414. The user interface includes an example input device such as a keyboard, mouse, touchscreen, button, joystick, or other user input device(s). The user interface 1414 also includes a display device 1418 such as a screen. The computing device 1400 shown in FIG. 14 also includes a network interface 1420 which is in communication with the CPU 1410 and other components. The network interface 1420 may allow the computing device 1400 to communicate with other computers, databases, networks, user devices, or any other computing capable devices. In some examples, additionally or alternatively, the method of communication may be through WIFI, cellular, Bluetooth Low Energy, wired communication, or any other kind of communication. In some examples, additionally or alternatively, the example computing device 1400 includes peripherals 1424 also in communication with the processor 1410. In some examples, additionally or alternatively, peripherals include table motors 1426 such as electric servo and/or stepper motors used for moving the table for the sample analysis. In some examples peripherals 1424 may include lights or camera equipment 1428, and/or instruments such as spectrometers, air compressors, etc. 1429. In some examples computing devices 1400, a memory 1422 is in communication with the processor 1410. In some examples, additionally or alternatively, this memory 1422 may include instructions to execute software such as an operating system 1432, network communications module 1434, other instructions 1436, applications 1438, applications to control the table or instrumentation 1440, applications to process testing data 1442, data storage 1458, data such as data tables 1460, transaction logs 1462, sample data 1464, sample location data 1470 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), tensor processing units ("TPUs"), graphics processing units ("GPUs"), programmable array logic ("PAL") devices, electrically programmable logic and memory devices and standard cell-based devices, as well as application specific integrated circuits. Some other possibilities for implementing aspects include: memory devices, microcontrollers with memory (such as 4PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertain that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a processor, the program code segments combine with the processor to provide a unique device that operates analogously to specific logic circuits.

The software is stored in a machine-readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A gemstone analysis system comprising:

a circular table configured to rotate about a central axis point; and a set of subsystems disposed about the circular table, wherein at least a first gemstone is configured to be fed to each of the set of subsystems by rotation of the circular table, the set of subsystems including:

a bulk feeder subsystem configured to receive the first gemstone;

a singulation subsystem configured to orient the first gemstone into a first orientation;

one or more metric subsystems configured to:

generate, by each of the one or more metric subsystems, data relating to the first gemstone;

derive, for each of the one or more metric subsystems, one or more metrics using the data generated by each of the one or more metric subsystems; and derive an evaluation metric for the first gemstone based on the derived metrics for the first gemstone; and a sorting subsystem configured to direct each of the first gemstone to a sorting bin based on the derived evaluation metric for the first gemstone.

2. The gemstone analysis system of claim 1, wherein the singulation subsystem includes:

one or more singulation arms disposed at the circular table, wherein the one or more singulation arms are configured to, as the circular table rotates, orient the first gemstone to the first orientation comprising a top-down orientation, and/or separate the first gemstone to at least a threshold separation from another gemstone.

3. The gemstone analysis system of claim 1, wherein the set of subsystems further include:

a photo position detection subsystem comprising:

one or more cameras configured to capture images of the first gemstone; and a computer vision model configured to process the captured images of the first gemstone and determine an actual orientation of the first gemstone.

4. The gemstone analysis system of claim 3, further comprising:

a re-feed subsystem including a first air burst element, the re-feed subsystem configured to:

responsive to a determination by the computer vision model that the actual orientation of the first gemstone is outside a threshold orientation range, receive an instruction to eject the first gemstone from the table; and remove the first gemstone, thereby directing the first gemstone to a bin disposed outside of the circular table.

5. The gemstone analysis system of claim 1, wherein any of the set of metric subsystems include:

one or more testing systems configured to capture the data relating to the first gemstone; and a metric generation model configured to process the data to determine at least one metric of the first gemstone, the at least one metric comprising a value specifying any of a size, a weight, a cut type, a clarity, an origin, a natural origin or synthetic origin, and a color of the first gemstone.

6. The gemstone analysis system of claim 5, wherein the one or more testing systems comprise an ultra-violet visible spectrophotometer capturing the data comprising an absorption spectrum of the first gemstone, and wherein the metric generation model is further configured to derive the metric based on the absorption spectrum of the first gemstone.

7. The gemstone analysis system of claim 1, further comprising:

A plurality of sorting bins, wherein each sorting bin corresponds with a range of evaluation metrics, and wherein the sorting subsystem is further configured to:

obtain an instruction to direct the first gemstone at a corresponding sorting bin, wherein the corresponding sorting bin comprises a stored corresponding range of evaluation metrics that includes the derived evaluation metric of the first gemstone; and remove the first gemstone by a burst of air or mechanical sweep arm thereby directing the first gemstone to the first sorting bin of the series of sorting bins.

8. The gemstone analysis system of claim 1, further comprising:

at least one computing node in electrical communication with the set of subsystems, wherein at least the deriving of the one or more metrics and the deriving of the evaluation metric for the first gemstone is performed by the at least one computing node.

9. A system comprising:

a table configured to rotate about a central point; and a set of modularly arranged subsystems disposed about the table, the set of subsystems including:

a bowl feeder subsystem configured to receive at least one gemstone;

a singulation subsystem including one or more singulation arms disposed at the table, wherein the one or more singulation arms are configured to, as the table rotates, orient the gemstone to a top-down orientation, and/or separate the gemstone to a threshold separation distance from another gemstone; and one or more metric subsystems comprising:

one or more sensors mounted on a removable and replaceable test platform, the sensors configured to capture data relating to the gemstone; and at least one computing node configured to:

obtain the data relating to the gemstone;

derive, using the obtained data, one or more metrics relating to the gemstone; and generate an evaluation metric for each gemstone based on the one or more metrics for the gemstone; and a sorting subsystem configured to direct each of the one or more gemstones to one of a plurality of sorting bins according to the derived evaluation metric for each gemstone.

10. The system of claim 9, further comprising:

a motor providing rotation of the table about a central axis point, wherein a top of the table is made of aluminum, stainless steel, glass, or plastics.

11. The system of claim 9, wherein the metric subsystems include at least one of image sensor, UV-Vis, Raman Probe, laser-induced photoluminescence analysis.

12. The system of claim 9, wherein the set of subsystems further include:

a photo position detection subsystem comprising:

one or more cameras configured to capture images of each of the one or more gemstones; and a computer vision model configured to process the captured images of each gemstone and determine an actual orientation of each gemstone.

13. The system of claim 9, wherein any of the set of metric subsystems include:

one or more testing systems configured to capture the data relating to the gemstone; and a metric generation model configured to process the data to determine at least one metric of the gemstone, the at least one metric comprising a value specifying any of a size, a natural origin, or a synthetic origin of the gemstone.

14. The system of claim 13, wherein the one or more testing systems comprise an ultra-violet visible spectrophotometer capturing the data comprising an absorption spectrum of the gemstone, and wherein the metric generation model is further configured to derive the metric based on the absorption spectrum of the gemstone.

15. The system of claim 9, wherein each of the plurality of sorting bins correspond with a range of evaluation metrics derived for the gemstone, and wherein the sorting subsystem is further configured to:

obtain an instruction to direct the gemstone at the first sorting bin, wherein the first sorting bin comprises a corresponding range of evaluation metrics that includes the derived evaluation metric of the gemstone; and provide a burst of air using a second air burst element to the gemstone, thereby directing the gemstone to the first sorting bin of the series of sorting bins.

16. A method performed by a gemstone analysis system for analyzing and sorting a gemstone, the method comprising:

receiving, at a bulk feeder subsystem, at least one gemstone;

disposing the gemstone on a rotating table;

orienting, by a singulation subsystem, the gemstone into a first orientation on the rotating table;

capturing, by one or more cameras of a photo position detection subsystem, images of the gemstone;

processing, by a computer vision model of the photo position detection subsystem, the images to determine an actual orientation of the gemstone;

determining, by the computer vision model, whether the actual orientation of the gemstone is outside a threshold orientation range;

responsive to determining that the actual orientation of the gemstone is outside the threshold orientation range, providing, by the computer vision model to a re-feed subsystem, an instruction to eject the gemstone;

responsive to the providing of the instruction to eject the gemstone, providing, by an air burst element of the re-feed subsystem, a burst of air to the gemstone, thereby directing the gemstone to a bin disposed outside of the table;

processing the gemstone by a set of metric subsystems, wherein the gemstone is rotated past subsystems via rotation of the table, wherein the processing comprises:

generating, by each of set of metric subsystems, data relating to the gemstone;

deriving, for each of the set of metric subsystems, one or more metrics for the gemstone from the data generated by each of the set of metric subsystems; and deriving an evaluation metric for the gemstone based on the derived metrics for the gemstone; and directing, by a sorting subsystem, the gemstone to a first sorting bin based on the derived evaluation metric for the gemstone.

17. The method of claim 16, wherein the one or more metrics comprising a value specifying any of a size, a weight, a cut type, a clarity, an origin, a natural origin or synthetic origin, and a color of the gemstone.

18. The method of claim 16, wherein any of the metric subsystems comprise an ultra-violet visible spectrophotometer capturing the data including an absorption spectrum of the gemstone, and wherein any of the set of metric subsystems are further configured to derive the metric based on the absorption spectrum of the gemstone.

* * * * *